(12) United States Patent
Forbes, Jr. et al.

(10) Patent No.: US 8,315,717 B2
(45) Date of Patent: *Nov. 20, 2012

(54) METHOD AND APPARATUS FOR ACTIVELY MANAGING CONSUMPTION OF ELECTRIC POWER SUPPLIED BY AN ELECTRIC UTILITY

(75) Inventors: Joseph W. Forbes, Jr., Wake Forest, NC (US); Joel L. Webb, Raleigh, NC (US)

(73) Assignee: Consert Inc., San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/172,389

(22) Filed: Jun. 29, 2011

(65) Prior Publication Data

US 2011/0257809 A1      Oct. 20, 2011

Related U.S. Application Data

(60) Continuation of application No. 12/715,195, filed on Mar. 1, 2010, now Pat. No. 8,032,233, which is a division of application No. 11/895,909, filed on Aug. 28, 2007, now Pat. No. 7,715,951.

(51) Int. Cl.

| | |
|---|---|
| G05B 11/01 | (2006.01) |
| G05D 3/12 | (2006.01) |
| G05D 5/00 | (2006.01) |
| G05D 9/00 | (2006.01) |
| G05D 11/00 | (2006.01) |
| G05D 17/00 | (2006.01) |
| G01R 21/00 | (2006.01) |
| G01R 21/06 | (2006.01) |
| G05F 5/00 | (2006.01) |
| G05F 3/00 | (2006.01) |
| G05F 3/02 | (2006.01) |
| G05F 1/00 | (2006.01) |

(52) U.S. Cl. .......... 700/22; 700/286; 700/291; 700/295; 700/297; 702/60; 702/61; 702/62; 323/299; 323/304; 323/318; 713/300; 713/310; 713/320; 713/340

(58) Field of Classification Search .................... 700/22, 700/286, 291, 295, 297; 702/60–62; 713/310, 713/320, 340; 323/299, 304, 318

See application file for complete search history.

(56) References Cited

U.S. PATENT DOCUMENTS 3,906,242 A  9/1975  Stevenson
(Continued)

FOREIGN PATENT DOCUMENTS

EP   1729223 A2   12/2006
(Continued)

OTHER PUBLICATIONS

International Search Report and Written Opinion dated Feb. 25, 2009 issued by the Korean Intellectual Property Office as International Searching Authority in connection with related International Application No. PCT/US2008/010199 (7 pages).

(Continued)

*Primary Examiner* — Ramesh Patel
(74) *Attorney, Agent, or Firm* — Daniel C. Crilly; GrayRobinson, P.A.

(57) ABSTRACT

A client device manages consumption of power supplied by an electric utility to one or more power consuming devices. Power flow to the power consuming devices is controlled by one or more controllable devices, which are controlled by the client device. The client device receives a power control message, such as from a remote system controller. The power control message may have been issued in furtherance of a power reduction event initiated by the electric utility. The power control message indicates an amount of electric power to be reduced and/or identification of at least one controllable device to be instructed to disable a flow of electric power to one or more associated power consuming devices. Responsive to the power control message, a flow of electric power is disabled or otherwise reduced to at least one power consuming device based on the contents of the power control message.

51 Claims, 8 Drawing Sheets

U.S. PATENT DOCUMENTS

| | | | |
|---|---|---|---|
| 4,023,043 A | 5/1977 | Stevenson | |
| 4,589,075 A | 5/1986 | Buennagel | |
| 4,799,059 A | 1/1989 | Grindahl et al. | |
| 4,819,180 A | 4/1989 | Hedman et al. | |
| 4,819,229 A | 4/1989 | Pritty et al. | |
| 5,237,507 A | 8/1993 | Chasek | |
| 5,361,982 A | 11/1994 | Liebl et al. | |
| 5,388,101 A | 2/1995 | Dinkins | |
| 5,481,546 A | 1/1996 | Dinkins | |
| 5,495,239 A | 2/1996 | Ouellette | |
| 5,502,339 A | 3/1996 | Hartig | |
| 5,544,036 A | 8/1996 | Brown, Jr. et al. | |
| 5,553,094 A | 9/1996 | Johnson et al. | |
| 5,570,002 A | 10/1996 | Castleman | |
| 5,592,491 A | 1/1997 | Dinkins | |
| 5,640,153 A | 6/1997 | Hildebrand et al. | |
| 5,644,173 A | 7/1997 | Elliason et al. | |
| 5,675,503 A | 10/1997 | Moe et al. | |
| 5,682,422 A | 10/1997 | Oliver | |
| 5,696,695 A | 12/1997 | Ehlers et al. | |
| 5,721,936 A | 2/1998 | Kikinis et al. | |
| 5,748,104 A | 5/1998 | Argyroudis et al. | |
| 5,926,776 A | 7/1999 | Glorioso et al. | |
| 6,018,690 A * | 1/2000 | Saito et al. | 700/295 |
| 6,047,274 A | 4/2000 | Johnson et al. | |
| 6,078,785 A | 6/2000 | Bush | |
| 6,102,487 A | 8/2000 | Ovrebo | |
| 6,115,676 A | 9/2000 | Rector et al. | |
| 6,122,603 A | 9/2000 | Budike, Jr. | |
| 6,154,859 A * | 11/2000 | Norizuki et al. | 714/47.1 |
| 6,178,362 B1 | 1/2001 | Woolard et al. | |
| 6,185,483 B1 | 2/2001 | Drees | |
| 6,216,956 B1 | 4/2001 | Ehlers et al. | |
| 6,233,327 B1 | 5/2001 | Petite | |
| 6,254,009 B1 | 7/2001 | Proffitt et al. | |
| 6,304,552 B1 | 10/2001 | Chapman et al. | |
| 6,374,101 B1 | 4/2002 | Gelbien | |
| 6,437,692 B1 | 8/2002 | Petite et al. | |
| 6,519,509 B1 | 2/2003 | Nierlich et al. | |
| 6,535,797 B1 | 3/2003 | Bowles et al. | |
| 6,577,962 B1 | 6/2003 | Afshari | |
| 6,601,033 B1 | 7/2003 | Sowinski | |
| 6,621,179 B1 | 9/2003 | Howard | |
| 6,622,097 B2 | 9/2003 | Hunter | |
| 6,622,925 B2 | 9/2003 | Carner et al. | |
| 6,628,113 B2 | 9/2003 | Gallavan | |
| 6,633,823 B2 | 10/2003 | Bartone et al. | |
| 6,671,586 B2 | 12/2003 | Davis et al. | |
| 6,681,154 B2 | 1/2004 | Nierlich et al. | |
| 6,687,574 B2 | 2/2004 | Pietrowicz et al. | |
| 6,732,055 B2 | 5/2004 | Bagepalli et al. | |
| 6,778,882 B2 | 8/2004 | Spool et al. | |
| 6,784,807 B2 | 8/2004 | Petite et al. | |
| 6,785,592 B1 | 8/2004 | Smith et al. | |
| 6,832,135 B2 | 12/2004 | Ying | |
| 6,834,811 B1 | 12/2004 | Huberman et al. | |
| 6,836,737 B2 | 12/2004 | Petite et al. | |
| 6,862,498 B2 | 3/2005 | Davis et al. | |
| 6,865,450 B2 | 3/2005 | Masticola et al. | |
| 6,868,293 B1 | 3/2005 | Schurr et al. | |
| 6,879,059 B2 | 4/2005 | Sleva | |
| 6,882,498 B2 | 4/2005 | Kurumatani et al. | |
| 6,891,838 B1 | 5/2005 | Petite et al. | |
| 6,904,336 B2 | 6/2005 | Raines et al. | |
| 6,906,617 B1 | 6/2005 | Van der Meulen | |
| 6,909,942 B2 | 6/2005 | Andarawis et al. | |
| 6,914,533 B2 | 7/2005 | Petite | |
| 6,914,893 B2 | 7/2005 | Petite | |
| 6,934,316 B2 | 8/2005 | Cornwall et al. | |
| 6,961,641 B1 * | 11/2005 | Forth et al. | 700/295 |
| 6,990,593 B2 | 1/2006 | Nakagawa | |
| 7,003,640 B2 | 2/2006 | Mayo et al. | |
| 7,019,667 B2 | 3/2006 | Petite et al. | |
| 7,035,719 B2 | 4/2006 | Howard et al. | |
| 7,039,532 B2 | 5/2006 | Hunter | |
| 7,053,767 B2 | 5/2006 | Petite et al. | |
| 7,088,014 B2 | 8/2006 | Nierlich et al. | |
| 7,103,511 B2 | 9/2006 | Petite | |
| 7,123,994 B2 | 10/2006 | Weik et al. | |
| 7,130,719 B2 | 10/2006 | Ehlers et al. | |
| 7,133,750 B2 | 11/2006 | Raines et al. | |
| 7,177,728 B2 | 2/2007 | Gardner | |
| 7,181,320 B2 | 2/2007 | Whiffen et al. | |
| 7,184,861 B2 | 2/2007 | Petite | |
| 7,200,134 B2 | 4/2007 | Proctor, Jr. et al. | |
| 7,206,670 B2 | 4/2007 | Pimputkar et al. | |
| 7,209,804 B2 | 4/2007 | Curt et al. | |
| 7,209,840 B2 | 4/2007 | Petite et al. | |
| 7,233,843 B2 | 6/2007 | Budhraja et al. | |
| 7,263,073 B2 | 8/2007 | Petite et al. | |
| 7,274,975 B2 | 9/2007 | Miller | |
| 7,289,887 B2 | 10/2007 | Rodgers | |
| 7,295,128 B2 | 11/2007 | Petite | |
| 7,305,282 B2 | 12/2007 | Chen | |
| 7,313,465 B1 | 12/2007 | O'Donnell | |
| 7,343,341 B2 | 3/2008 | Sandor et al. | |
| 7,345,998 B2 | 3/2008 | Cregg et al. | |
| 7,346,463 B2 | 3/2008 | Petite et al. | |
| 7,366,164 B1 | 4/2008 | Habib et al. | |
| 7,397,907 B2 | 7/2008 | Petite | |
| 7,406,364 B2 | 7/2008 | Andrén et al. | |
| 7,412,304 B2 | 8/2008 | Uenou | |
| 7,424,527 B2 | 9/2008 | Petite | |
| 7,440,871 B2 | 10/2008 | McConnell et al. | |
| 7,451,019 B2 | 11/2008 | Rodgers | |
| 7,468,661 B2 | 12/2008 | Petite et al. | |
| 7,480,501 B2 | 1/2009 | Petite | |
| 7,486,681 B2 | 2/2009 | Weber | |
| 7,528,503 B2 | 5/2009 | Rognli et al. | |
| 7,536,240 B2 | 5/2009 | McIntyre et al. | |
| 7,541,941 B2 | 6/2009 | Bogolea et al. | |
| 7,565,227 B2 * | 7/2009 | Richard et al. | 700/291 |
| 7,650,425 B2 | 1/2010 | Davis et al. | |
| 7,697,492 B2 | 4/2010 | Petite | |
| 7,711,796 B2 | 5/2010 | Gutt et al. | |
| 7,715,951 B2 * | 5/2010 | Forbes et al. | 700/291 |
| 7,738,999 B2 | 6/2010 | Petite | |
| 7,739,378 B2 | 6/2010 | Petite | |
| 8,010,812 B2 * | 8/2011 | Forbes et al. | 713/300 |
| 8,032,233 B2 * | 10/2011 | Forbes et al. | 700/22 |
| 8,131,403 B2 | 3/2012 | Forbes, Jr. et al. | |
| 8,145,361 B2 | 3/2012 | Forbes, Jr. et al. | |
| 8,260,470 B2 | 9/2012 | Forbes, Jr. et al. | |
| 2001/0025209 A1 | 9/2001 | Fukui et al. | |
| 2001/0030468 A1 | 10/2001 | Anderson et al. | |
| 2001/0038343 A1 | 11/2001 | Meyer et al. | |
| 2002/0019802 A1 | 2/2002 | Malme et al. | |
| 2002/0035496 A1 | 3/2002 | Fukushima et al. | |
| 2002/0109607 A1 | 8/2002 | Cumeralto et al. | |
| 2002/0138176 A1 | 9/2002 | Davis et al. | |
| 2002/0143693 A1 | 10/2002 | Soestbergen et al. | |
| 2003/0009705 A1 | 1/2003 | Thelander et al. | |
| 2003/0036820 A1 | 2/2003 | Yellepeddy | |
| 2003/0040844 A1 | 2/2003 | Spool et al. | |
| 2003/0063723 A1 | 4/2003 | Booth et al. | |
| 2003/0074304 A1 | 4/2003 | Okada | |
| 2003/0083980 A1 | 5/2003 | Satake | |
| 2003/0144864 A1 | 7/2003 | Mazzarella | |
| 2003/0225483 A1 | 12/2003 | Santinato et al. | |
| 2003/0229572 A1 | 12/2003 | Raines et al. | |
| 2003/0233201 A1 | 12/2003 | Horst et al. | |
| 2004/0006439 A1 | 1/2004 | Hunter | |
| 2004/0088083 A1 | 5/2004 | Davis et al. | |
| 2004/0095237 A1 | 5/2004 | Chen et al. | |
| 2004/0117330 A1 | 6/2004 | Ehlers et al. | |
| 2004/0128266 A1 | 7/2004 | Yellepeddy et al. | |
| 2004/0153170 A1 | 8/2004 | Santacatterina et al. | |
| 2004/0158478 A1 | 8/2004 | Zimmerman | |
| 2004/0162793 A1 | 8/2004 | Scott et al. | |
| 2004/0193329 A1 | 9/2004 | Ransom et al. | |
| 2004/0230533 A1 | 11/2004 | Benco | |
| 2005/0033481 A1 | 2/2005 | Budhraja et al. | |
| 2005/0055432 A1 | 3/2005 | Rodgers | |
| 2005/0065742 A1 | 3/2005 | Rodgers | |
| 2005/0096856 A1 | 5/2005 | Lubkeman et al. | |
| 2005/0096857 A1 * | 5/2005 | Hunter | 702/60 |
| 2005/0116836 A1 | 6/2005 | Perry et al. | |

| | | | |
|---|---|---|---|
| 2005/0125243 A1 | 6/2005 | Villalobos | |
| 2005/0138432 A1* | 6/2005 | Ransom et al. | 713/201 |
| 2005/0192711 A1 | 9/2005 | Raines et al. | |
| 2005/0192713 A1 | 9/2005 | Weik et al. | |
| 2005/0216302 A1 | 9/2005 | Raji et al. | |
| 2005/0216580 A1 | 9/2005 | Raji et al. | |
| 2005/0234600 A1 | 10/2005 | Boucher et al. | |
| 2005/0240314 A1 | 10/2005 | Martinez | |
| 2005/0240315 A1 | 10/2005 | Booth et al. | |
| 2005/0246190 A1 | 11/2005 | Sandor et al. | |
| 2005/0267642 A1 | 12/2005 | Whiffen et al. | |
| 2005/0276222 A1 | 12/2005 | Kumar et al. | |
| 2006/0020544 A1 | 1/2006 | Kaveski | |
| 2006/0022841 A1 | 2/2006 | Hoiness et al. | |
| 2006/0025891 A1 | 2/2006 | Budike, Jr. | |
| 2006/0031934 A1 | 2/2006 | Kriegel | |
| 2006/0064205 A1 | 3/2006 | Ying | |
| 2006/0106635 A1 | 5/2006 | Ulrich et al. | |
| 2006/0142900 A1 | 6/2006 | Rothman et al. | |
| 2006/0142961 A1 | 6/2006 | Johnson et al. | |
| 2006/0161450 A1 | 7/2006 | Carey et al. | |
| 2006/0168191 A1 | 7/2006 | Ives | |
| 2006/0195334 A1 | 8/2006 | Reeb et al. | |
| 2006/0259199 A1 | 11/2006 | Gjerde et al. | |
| 2006/0271244 A1 | 11/2006 | Cumming et al. | |
| 2006/0271314 A1 | 11/2006 | Hayes | |
| 2007/0021874 A1 | 1/2007 | Rognli et al. | |
| 2007/0025249 A1 | 2/2007 | Yeom | |
| 2007/0058453 A1 | 3/2007 | Shaffer et al. | |
| 2007/0058629 A1 | 3/2007 | Luft | |
| 2007/0070895 A1 | 3/2007 | Narvaez | |
| 2007/0085702 A1 | 4/2007 | Walters et al. | |
| 2007/0091900 A1 | 4/2007 | Asthana et al. | |
| 2007/0100503 A1 | 5/2007 | Balan et al. | |
| 2007/0203722 A1 | 8/2007 | Richards et al. | |
| 2007/0204176 A1 | 8/2007 | Shaffer et al. | |
| 2007/0205915 A1 | 9/2007 | Shuey et al. | |
| 2007/0213878 A1 | 9/2007 | Chen | |
| 2007/0255457 A1 | 11/2007 | Whitcomb et al. | |
| 2007/0286210 A1 | 12/2007 | Gutt et al. | |
| 2007/0291644 A1 | 12/2007 | Roberts et al. | |
| 2007/0299562 A1 | 12/2007 | Kates | |
| 2008/0015976 A1 | 1/2008 | Sandor et al. | |
| 2008/0091625 A1 | 4/2008 | Kremen | |
| 2008/0130673 A1 | 6/2008 | Cregg et al. | |
| 2008/0147465 A1 | 6/2008 | Raines et al. | |
| 2008/0165714 A1 | 7/2008 | Dettinger et al. | |
| 2008/0172312 A1 | 7/2008 | Synesiou et al. | |
| 2008/0177423 A1 | 7/2008 | Brickfield et al. | |
| 2008/0177678 A1 | 7/2008 | Di Martini | |
| 2008/0224892 A1 | 9/2008 | Bogolea et al. | |
| 2008/0231114 A1 | 9/2008 | Tolnar et al. | |
| 2008/0238710 A1 | 10/2008 | Tolnar et al. | |
| 2008/0255899 A1 | 10/2008 | McConnell et al. | |
| 2008/0281473 A1* | 11/2008 | Pitt | 700/291 |
| 2009/0018884 A1 | 1/2009 | McConnell et al. | |
| 2009/0043519 A1 | 2/2009 | Bridges et al. | |
| 2009/0043520 A1 | 2/2009 | Pollack et al. | |
| 2009/0055031 A1* | 2/2009 | Slota et al. | 700/287 |
| 2009/0062970 A1 | 3/2009 | Forbes, Jr. et al. | |
| 2009/0063122 A1 | 3/2009 | Nasle | |
| 2009/0063228 A1 | 3/2009 | Forbes, Jr. | |
| 2009/0088991 A1 | 4/2009 | Brzezowski et al. | |
| 2009/0106571 A1 | 4/2009 | Low et al. | |
| 2009/0112758 A1 | 4/2009 | Herzig | |
| 2009/0135836 A1 | 5/2009 | Veillette | |
| 2009/0187499 A1 | 7/2009 | Mulder et al. | |
| 2009/0240381 A1 | 9/2009 | Lane | |
| 2009/0313033 A1 | 12/2009 | Hafner et al. | |
| 2010/0076825 A1 | 3/2010 | Sato et al. | |
| 2010/0106575 A1 | 4/2010 | Bixby et al. | |
| 2010/0161148 A1 | 6/2010 | Forbes, Jr. et al. | |
| 2010/0179670 A1 | 7/2010 | Forbes, Jr. et al. | |
| 2010/0191862 A1 | 7/2010 | Forbes, Jr. et al. | |
| 2010/0218010 A1 | 8/2010 | Musti et al. | |
| 2010/0222935 A1 | 9/2010 | Forbes, Jr. et al. | |
| 2010/0235008 A1 | 9/2010 | Forbes, Jr. et al. | |
| 2011/0022239 A1 | 1/2011 | Forbes, Jr. | |
| 2011/0029655 A1 | 2/2011 | Forbes, Jr. | |
| 2011/0061014 A1 | 3/2011 | Frader-Thompson et al. | |
| 2011/0063126 A1 | 3/2011 | Kennedy et al. | |
| 2011/0082598 A1 | 4/2011 | Boretto et al. | |
| 2011/0115302 A1* | 5/2011 | Slota et al. | 307/87 |
| 2011/0125422 A1 | 5/2011 | Goncalves Jota et al. | |
| 2011/0133655 A1* | 6/2011 | Recker et al. | 315/159 |
| 2011/0144819 A1 | 6/2011 | Andrews et al. | |
| 2011/0172837 A1 | 7/2011 | Forbes, Jr. | |
| 2011/0172841 A1* | 7/2011 | Forbes, Jr. | 700/292 |
| 2011/0231320 A1 | 9/2011 | Irving | |
| 2011/0251730 A1* | 10/2011 | Pitt | 700/291 |
| 2011/0251807 A1 | 10/2011 | Rada et al. | |
| 2011/0258022 A1* | 10/2011 | Forbes et al. | 705/7.39 |

FOREIGN PATENT DOCUMENTS

| | | |
|---|---|---|
| JP | 2000078748 A | 3/2000 |
| JP | 2001008380 A | 1/2001 |
| JP | 2001306839 | 11/2001 |
| JP | 2002176729 A | 6/2002 |
| JP | 2002281666 A | 9/2002 |
| JP | 2003067457 A | 3/2003 |
| JP | 2004248174 A | 2/2004 |
| JP | 2004112868 A | 4/2004 |
| JP | 2004180412 | 6/2004 |
| JP | 2004301505 A | 10/2004 |
| JP | 2006060911 A | 3/2006 |
| JP | 2006277597 A | 10/2006 |
| JP | 2007132553 A | 5/2007 |
| JP | 2010081722 A | 4/2010 |
| JP | 2010119269 A | 5/2010 |
| JP | 2010183760 A | 8/2010 |
| KR | 2005001584 A | 1/2005 |
| KR | 20050045272 A | 5/2005 |
| KR | 20060036171 A | 4/2006 |
| KR | 20070008321 A | 1/2007 |
| KR | 100701298 B1 | 3/2007 |
| KR | 20070098172 A | 10/2007 |
| KR | 20080112692 A | 12/2008 |
| WO | 2007136456 A2 | 11/2007 |
| WO | 2008125696 A2 | 10/2008 |
| WO | 2009032161 A2 | 3/2009 |
| WO | 2009032162 A2 | 3/2009 |
| WO | 2010129059 A1 | 11/2010 |
| WO | 2010129958 A2 | 11/2010 |
| WO | 2010132456 A2 | 11/2010 |
| WO | 2010132469 A2 | 11/2010 |
| WO | 2010132477 A2 | 11/2010 |
| WO | 2010134987 A1 | 11/2010 |
| WO | 2011043818 A2 | 4/2011 |
| WO | 2011046589 A1 | 4/2011 |

OTHER PUBLICATIONS

Office Action dated Jul. 17, 2009, as entered in grandparent U.S. Appl. No. 11/895,909 (11 pages).

Amendment and Response dated Oct. 15, 2009, as filed in grandparent U.S. Appl. No. 11/895,909 (14 pages).

Notice of Allowability dated Dec. 23, 2009, as entered in grandparent U.S. Appl. No. 11/895,909 (4 pages).

Office Action dated May 19, 2010, as entered in parent U.S. Appl. No. 12/715,195 (10 pages).

Amendment and Response dated Jul. 19, 2010 as filed in parent U.S. Appl. No. 12/715,195 (20 pages).

International Search Report and Written Opinion dated Mar. 6, 2009 issued by the Korean Intellectual Property Office as International Searching Authority in connection with related International Application No. PCT/US2008/010200 (9 pages).

International Search Report and Written Opinion dated Jul. 15, 2010 issued by the United States Patent and Trademark Office as International Searching Authority in connection with related International Application No. PCT/US10/01354 (10 pages).

International Search Report and Written Opinion dated Jul. 23, 2010 issued by the United States Patent and Trademark Office as International Searching Authority in connection with related International Application No. PCT/US10/01489 (11 pages).

Michael Ahlheim and Friedrich Schneider, Allowing for Household Preferences in Emission Trading, A Contribution to the Climate Policy Debate, Environmental and Resource Economics, vol. 21, pp. 317-342, 2002 Kluwer Academic Publishers, Printed in the Netherlands (26 pages).
Olivier Rousse, Environmental and economic benefits resulting from citizens' participation in CO2 emissions trading: An efficient alternative solution to the voluntary compensation of CO2 emissions, Energy Policy 36 (2008), pp. 388-397 (10 pages).
Notice of Allowability dated Aug. 31, 2010, as entered in related U.S. Appl. No. 12/715,124 (5 pages).
Notice of Allowability dated Sep. 8, 2010, as entered in parent U.S. Appl. No. 12/715,195 (4 pages).
B.J. Kirby, Spinning Reserve from Responsive Loads, Oak Ridge National Laboratory, United States Dept. of Energy, Mar. 2003 (54 pages).
Pablo A. Ruiz and Peter W. Sauer, Valuation of Reserve Services, IEEE Proceedings of the 41st Hawaii International Conference on System Sciences, 2008 (9 pages).
Eric Hirst and Richard Cowart, Demand Side Resources and Reliability, New England Demand Response Initiative, Mar. 20, 2002 (32 pages).
C.W. Gellings and W.M. Smith, Integrating Demand-Side Management into Utility Planning, Proceedings of the IEEE, vol. 77, Issue: 6, Jun. 1989, pp. 908-918 (Abstract only).
M. Rashidi-Nejad, Y.H. Song, and M.H. Javidi-Dasht-Bayaz, Operating Reserve Provision in Deregulated Power Markets, IEEE Power Engineering Society Winter Meeting, vol. 2, 2002, pp. 1305-1310 (Abstract only).
L.T. Anstine, R.E. Burke, J.E. Casey, R. Holgate, R.S. John, and H.G. Stewart, Application of Probability Methods to the Determination of Spinning Reserve Requirements for the Pennsylvania-New Jersey-Maryland Interconnection; IEEE Transactions on Power Apparatus and Systems, vol. 82, Issue 68, Oct. 1963, pp. 726-735 (Abstract only).
Zhu Jinxiang, G. Jordan, and S. Ihara, The Market for Spinning Reserve and Its Impacts on Energy Prices, IEEE Power Engineering Society Winter Meeting, vol. 2, 2000, pp. 1202-1207 (Abstract Only).
Kathleen Spees and Lester B. Lave, Demand Response and Electricity Market Efficiency, The Electricity Journal, vol. 20, Issue 3, Apr. 2007 (online Mar. 27, 2007), pp. 69-85 (Abstract only).
International Search Report and Written Opinion dated Nov. 30, 2010 issued by the Korean Intellectual Property Office as International Searching Authority in connection with related International Application No. PCT/US2010/034395 (8 pages).
International Search Report and Written Opinion dated Dec. 20, 2010 issued by the United States Patent and Trademark Office as International Searching Authority in connection with related International Application No. PCT/US10/02676 (20 pages).
International Search Report and Written Opinion dated Dec. 21, 2010 issued by the Korean Intellectual Property Office as International Searching Authority in connection with related International Application No. PCT/US2010/034247 (7 pages).
International Search Report and Written Opinion dated Dec. 22, 2010 issued by the Korean Intellectual Property Office as International Searching Authority in connection with related International Application No. PCT/US2010/034409 (7 pages).
International Search Report and Written Opinion dated Dec. 22, 2010 issued by the Korean Intellectual Property Office as International Searching Authority in connection with related International Application No. PCT/US2010/034418 (7 pages).
Office Action dated Jan. 7, 2011 as issued by the Australian Patent Office (Australian Government IP Australia) in connection with related Australian Application No. 2008296979 (2 pages).
Mashiro Inoue, Toshiyasu Higuma, Yoshiaki Ito, Noriyuki Kushiro and Hitoshi Kubota, Network Architecture for Home Energy Management System, IEEE Transactions on Consumer Electronics, vol. 49, Issue 3, Aug. 2003, pp. 606-613 (8 pages).
Eric Hirst and Brendan Kirby, Opportunities for Demand Participation in New England Contingency-Reserve Markets, New England Demand Response Initiative, Feb. 2003 (15 pages).
Paul Darbee, INSTEON the Details, Smarthouse, Inc., Aug. 11, 2005, 68 pages.
Paul Darbee, INSTEON Compared, SmartLabs, Inc., Jan. 2, 2006, 69 pages.
International Search Report and Written Opinion dated May 31, 2011 issued by the Korean Intellectual Property Office as International Searching Authority in connection with related International Application No. PCT/US2010/002709 (7 pages).
U.S. Patent and Trademark Office; Office Action dated Sep. 13, 2011 as entered in related U.S. Appl. No. 12/001,819 (18 pages).
The Patent Office of the People's Republic of China; "Notification of the First Office Action" dated Oct. 17, 2011 as entered in related Chinese Application No. 200880113530.X (9 pages).
The Patent Office of the People's Republic of China; "Notification of the First Office Action" dated Oct. 17, 2011 as entered in counterpart Chinese Application No. 200880113529.7 (11 pages).
U.S. Patent and Trademark Office; Office Action dated Jan. 3, 2012, as entered in related U.S. Appl. No. 12/702,768 (9 pages).
U.S. Patent and Trademark Office; Office Action dated Dec. 15, 2011, as entered in related U.S. Appl. No. 13/172,261 (8 pages).
U.S. Patent and Trademark Office; Notice of Allowability dated Jan. 25, 2012, as entered in related U.S. Appl. No. 12/702,640 (11 pages).
U.S. Patent and Trademark Office; Notice of Allowability dated Feb. 10, 2012, as entered in related U.S. Appl. No. 12/702,785 (10 pages).
U.S. Patent and Trademark Office; Office Action dated Mar. 9, 2012, as entered in related U.S. Appl. No. 12/783,415 (36 pages).
Amendment and Response dated Mar. 13, 2012, as filed in related U.S. Appl. No. 12/001,819 (21 pages).
Japanese Patent Office; Notification of First Office Action dated Mar. 21, 2012, as entered in related Japanese Application No. 2010522954 (10 pages).
U.S. Patent and Trademark Office; Office Action dated May 18, 2012, as entered in related U.S. Appl. No. 12/001,819 (21 pages).
Amendment and Response dated Apr. 2, 2012, as filed in related U.S. Appl. No. 12/702,768 (12 pages).
U.S. Patent and Trademark Office; Notice of Allowability dated May 2, 2012, as entered in related U.S. Appl. No. 12/702,768 (7 pages).
Amendment and Response dated May 7, 2012, as filed in related U.S. Appl. No. 13/172,261 (30 pages).
U.S. Patent and Trademark Office; Office Action dated Jun. 1, 2012, as entered in related U.S. Appl. No. 12/775,979 (6 pages).
Response to Examination Report dated Jun. 5, 2012, as filed in related Australian Patent Application No. 2008296979 (33 pages).
European Patent Office, Extended European Search Report (including Supplementary European Search Report and European Search Opinion) dated May 29, 2012, as issued in connection with counterpart European Application No. 08795673.6 (7 pages).
European Patent Office, Extended European Search Report (including Supplementary European Search Report and European Search Opinion) dated Jun. 1, 2012, as issued in connection with related European Application No. 08795674.4 (6 pages).
U.S. Patent and Trademark Office; Notice of Allowability dated Jun. 5, 2012, as entered in related U.S. Appl. No. 13/172,261 (4 pages).
International Search Report and Written Opinion dated Jun. 22, 2012 issued by the Korean Intellectual Property Office as International Searching Authority in connection with related International Application No. PCT/US2012/023488 (8 pages).
Patent Examination Report No. 3 dated Jul. 6, 2012 from the Australian Patent Office (Australian Government IP Australia) in connection with related Australian Application No. 2008296979 (4 pages).
Decision of Rejection issued Jul. 31, 2012 by the Japanese Patent Office in connection with related Japanese Application No. 2010-522953 (2 pages).

* cited by examiner

METHOD AND APPARATUS FOR ACTIVELY MANAGING CONSUMPTION OF ELECTRIC POWER SUPPLIED BY AN ELECTRIC UTILITY

CROSS-REFERENCE TO RELATED APPLICATIONS

The present application is a continuation of U.S. application Ser. No. 12/715,195 filed on Mar. 1, 2010 now U.S. Pat. No. 8,032,233, which is a division of U.S. application Ser. No. 11/895,909 filed Aug. 28, 2007, now U.S. Pat. No. 7,715,951, and is incorporated herein by this reference as if fully set forth herein. The present application is also related to U.S. application Ser. No. 12/715,124 filed on Mar. 1, 2010 and U.S. application Ser. No. 12/001,819 filed on Dec. 13, 2007.

BACKGROUND OF THE INVENTION

1. Field of the Invention

The present invention relates generally to the field of electrical power load control systems and more particularly to a method and system for actively controlling power load management for individual customers and optionally tracking power savings for both the individual customer as well as the overall electric utility.

2. Description of Related Art

The increased awareness of the impact of carbon emissions from the use of fossil fueled electric generation combined with the increased cost of producing peak power during high load conditions has increased the need for alternative solutions utilizing load control as a mechanism to defer, or in some cases eliminate, the need for the deployment of additional generation capacity by electric utilities. Existing electric utilities are pressed for methods to defer or eliminate the need for construction of fossil-based electricity generation. Today, a patchwork of systems exist to implement demand response load management programs, whereby various radio subsystems in various frequency bands utilize "one-way" transmit only methods of communication. Under these programs, RF controlled relay switches are typically attached to a customer's air conditioner, water heater, or pool pump. A blanket command is sent out to a specific geographic area whereby all receiving units within the range of the transmitting station (e.g., typically a paging network) are turned off during peak hours at the election of the power utility. After a period of time when the peak load has passed, a second blanket command is sent to turn on those devices that have been turned off.

While tele-metering has been used for the express purpose of reporting energy usage, no techniques exist for calculating power consumption, carbon gas emissions, sulfur dioxide ($SO_2$) gas emissions, and/or nitrogen dioxide ($NO_2$) emissions, and reporting the state of a particular device under the control of a two-way positive control load management device. In particular, one way wireless communications devices have been utilized to de-activate electrical appliances, such as heating, ventilation, and air-conditioning (HVAC) units, water heaters, pool pumps, and lighting, from an existing electrical supplier or distribution partner's network. These devices have typically been used in combination with wireless paging receivers that receive "on" or "off" commands from a paging transmitter. Additionally, the one-way devices are typically connected to a serving electrical supplier's control center via landline trunks, or in some cases, microwave transmission to the paging transmitter. The customer subscribing to the load management program receives a discount for allowing the serving electrical supplier (utility) to connect to their electrical appliances and deactivate those appliances during high energy usage periods.

While one-way devices are generally industry standard and relatively inexpensive to implement, the lack of a return path from the receiver, combined with the lack of information on the actual devices connected to the receiver, make the system highly inefficient for measuring the actual load shed to the serving utility. While the differential current draw is measurable on the serving electric utility's transmission lines, the actual load shed is approximate and the location of the load deferral is approximated at the control center of the serving utility.

One exemplary tele-metering system is disclosed in U.S. Pat. No. 6,891,838 B1. This patent describes details surrounding a mesh communication of residential devices and the reporting and control of those devices, via WANs, to a computer. The stated design goal in this patent is to facilitate the "monitoring and control of residential automation systems." This patent does not explain how a serving utility or customer could actively control the devices to facilitate the reduction of electricity. In contrast, this patent discloses techniques that could be utilized for reporting information that is being displayed by the serving utility's power meter (as do many other prior applications in the field of tele-metering).

An additional exemplary tele-metering system is disclosed in U.S. Patent Application Publication No. 2005/0240315 A1. The primary purpose of this published application is not to control utility loads, but rather "to provide an improved interactive system for remotely monitoring and establishing the status of a customer utility load." A stated goal of this publication is to reduce the amount of time utility field personnel have to spend in the field servicing meters by utilizing wireless technology.

Another prior art system is disclosed in U.S. Pat. No. 6,633,823 B2, which describes, in detail, the use of proprietary hardware to remotely turn off or turn on devices within a building or residence. While initially this prior art generally describes a system that would assist utilities in managing power load control, the prior art does not contain the unique attributes necessary to construct or implement a complete system. In particular, this patent is deficient in the areas of security, load accuracy of a controlled device, and methods disclosing how a customer utilizing applicable hardware might set parameters, such as temperature set points, customer preference information, and customer overrides, within an intelligent algorithm that reduces the probability of customer dissatisfaction and service cancellation or churn.

Attempts have been made to bridge the gap between one-way, un-verified power load control management systems and positive control verified power load control management systems. However, until recently, technologies such as smart breakers and command relay devices were not considered for use in residential and commercial environments primarily due to high cost entry points, lack of customer demand, and the cost of power generation relative to the cost of implementing load control.

One such gap-bridging attempt is described in U.S. Patent Application Publication No. US 2005/0065742 A1. This publication discloses a system and method for remote power management using IEEE 802 based wireless communication links. The system disclosed in this publication includes an on-premise processor (OPP), a host processor, and an end device. The host processor issues power management commands to the OPP, which in turn relays the commands to the end devices under its management. While the disclosed OPP does provide some intelligence in the power management system, it does not determine which end devices under its control to turn-off during a power reduction event, instead relying on the host device to make such decision. For example, during a power reduction event, the end device must request permission from the OPP to turn on. The request is forwarded to the host device for a decision on the request in view of the parameters of the on-going power reduction event. The system also contemplates periodic reading of utility meters by the OPP and storage of the read data in the OPP for later communication to the host device. The OPP may also include intelligence to indicate to the host processor that the OPP will not be able to comply with a power reduction command due to the inability of a load under the OPP's control to be deactivated. However, neither the host processor nor the OPP determine which loads to remove in order to satisfy a power reduction command from an electric utility, particularly when the command is issued by one of several utilities under the management of a power management system. Further, neither the host processor nor the OPP tracks or accumulates power saved and/or carbon credits earned on a per customer or per utility basis for future use by the utility and/or customer. Still further, the system of this publication lacks a reward incentive program to customers based on their participation in the power management system. Still further, the system described in this publication does not provide for secure communications between the host processor and the OPP, and/or between the OPP and the end device. As a result, the described system lacks many features that may be necessary for a commercially viable implementation.

Therefore, a need exists for a system and method for active power load management for individual customers that is optionally capable of tracking power savings for the individual customer as well as the electric utility to thereby overcome the shortcomings of the prior art.

DETAILED DESCRIPTION OF EXEMPLARY EMBODIMENTS

Figure 1:
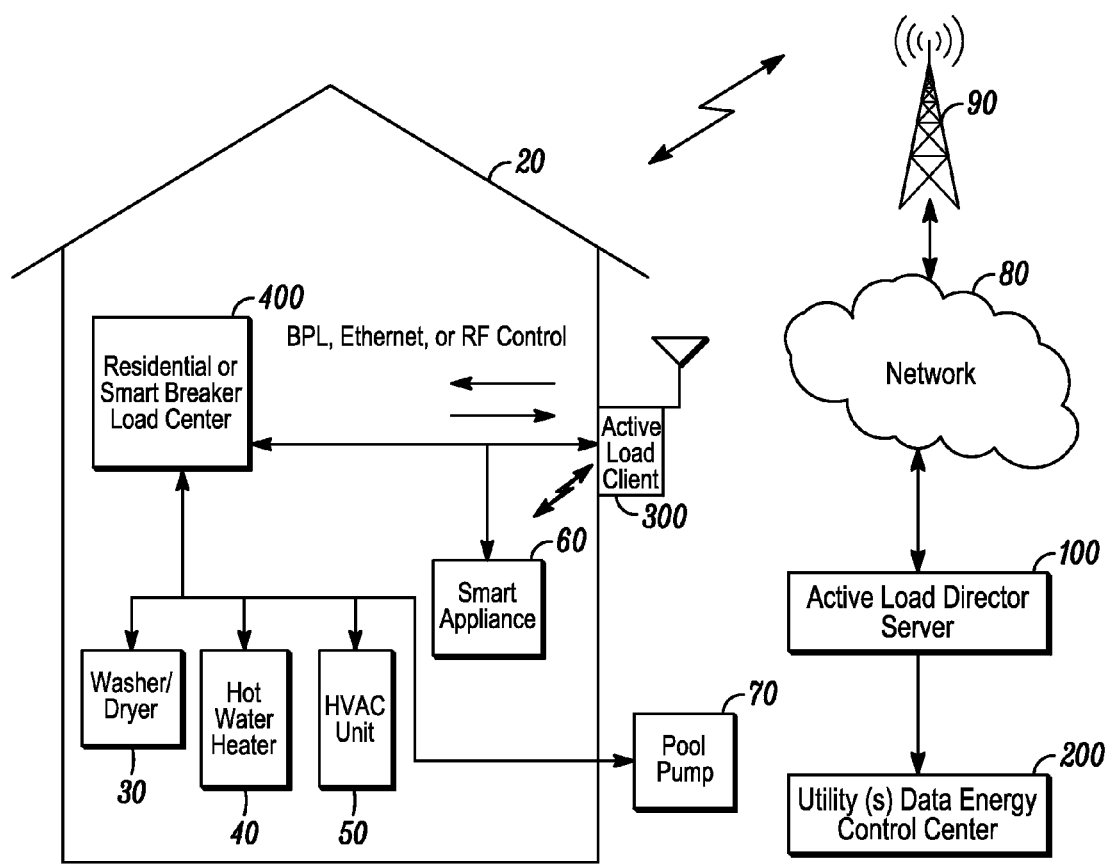
FIG. 1 is a block diagram of an IP-based active power load management system in accordance with an exemplary embodiment of the present invention.

Before describing in detail exemplary embodiments that are in accordance with the present invention, it should be observed that the embodiments reside primarily in combinations of apparatus components and processing steps related to actively managing power loading on an individual subscriber basis and optionally tracking power savings incurred by both individual subscribers and an electric utility. Accordingly, the apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms, such as "first" and "second," "top" and "bottom," and the like, may be used solely to distinguish one entity or element from another entity or element without necessarily requiring or implying any physical or logical relationship or order between such entities or elements. The terms "comprises," "comprising," or any other variation thereof are intended to cover a non-exclusive inclusion, such that a process, method, article, or apparatus that comprises a list of elements does not include only those elements, but may include other elements not expressly listed or inherent to such process, method, article, or apparatus. The term "plurality of" as used in connection with any object or action means two or more of such object or action. A claim element proceeded by the article "a" or "an" does not, without more constraints, preclude the existence of additional identical elements in the process, method, article, or apparatus that includes the element. Additionally, the term "ZigBee" refers to any wireless communication protocol adopted by the Institute of Electronics & Electrical Engineers (IEEE) according to standard 802.15.4 or any successor standard(s), the term "Wi-Fi" refers to any communication protocol adopted by the IEEE under standard 802.11 or any successor standard(s), the term "WiMax" refers to any communication protocol adopted by the IEEE under standard 802.16 or any successor standard(s), and the term "Bluetooth" refers to any short-range communication protocol implementing IEEE standard 802.15.1 or any successor standard(s).

It will be appreciated that embodiments of the invention described herein may be comprised of one or more conventional processors and unique stored program instructions that control the one or more processors to implement, in conjunction with certain non-processor circuits, some, most, or all of the functions for managing power load distribution and tracking individual subscriber power consumption and savings in one or more power load management systems as described herein. The non-processor circuits may include, but are not limited to, radio receivers, radio transmitters, antennas, modems, signal drivers, clock circuits, power source circuits, relays, meters, smart breakers, current sensors, and user input devices. As such, these functions may be interpreted as steps of a method to distribute information and control signals between devices in a power load management system. Alternatively, some or all functions could be implemented by a state machine that has no stored program instructions, or in one or more application specific integrated circuits (ASICs), in which each function or some combinations of functions are implemented as custom logic. Of course, a combination of the two approaches could be used. Thus, methods and means for these functions have been described herein. Further, it is expected that one of ordinary skill in the art, notwithstanding possibly significant effort and many design choices motivated by, for example, available time, current technology, and economic considerations, when guided by the concepts and principles disclosed herein, will be readily capable of generating such software instructions, programs and integrated circuits (ICs), and appropriately arranging and functionally integrating such non-processor circuits, without undue experimentation.

Recently, the IEEE has released improved WiMax wireless standards that have facilitated the consideration of new technologies to improve the response and control of power load control devices employing smart breaker technologies. Embodiments of the present invention expand upon and enhance prior technologies by, among other things, employing WiMax or IP-based load control in a system with the ability to monitor, in real time, the amount of power deferred (or carbon, $SO_2$, or $NO_2$ eliminated). These improvements allow new options for electric utilities to defer or invest in new power generation that is friendlier to the environment.

IP-based power management is advantageous over existing systems for many reasons. For example, positive control allows a system controller to receive a response from an end device installed at a customer location, which indicates that the actual target device has turned "off" or "on." Additionally, each equipment identifier is unique and each IP address is either dynamically assigned when the device is activated (e.g., through use of the dynamic host configuration protocol (DHCP)) or statically assigned by the serving IP network, thereby providing enhanced security to protect against an act of random terrorism or sabotage inadvertently shutting down power services. Existing power management systems, including those utilizing radio subsystems, do not address security problems adequately and thus are more likely susceptible to hostile or malicious acts.

IP-based systems are also bandwidth or network efficient. For example, IP devices are controlled via the 7-layer Open Systems Interconnection (OSI) model whereby the payload of each packet can contain a message or "change in state" and does not require synchronous communication. This method of transmission allows for very minimum overhead and low data rates on a broadband network. Additionally, IP devices can report many states, including "no power." For example, the active load client 300 may be implemented with a battery backup mechanism to provide backup or auxiliary power to the active load client 300 when AC power is lost. In this case, when battery backup is invoked, the active load client 300 can report a "no power" condition. Alternatively, a "no power" condition may be assumed if an active load client 300 fails to timely respond to a message (e.g., a poll or other message) from the ALD server 100, particularly where multiple active load clients 300 in a geographic area fail to timely respond to the ALD server messaging. Because the geographic location of each customer premises and active load client 300 may be known at the time of installation or thereafter (e.g., using GPS coordinates), such network outages may be located on a per meter basis.

One of the most beneficial advantages of an IP-based power management system, as provided in one embodiment of the present invention, is accurate reporting of the actual amount of power saved by each customer on an individual basis. Embodiments of the present invention monitor and calculate precisely how many kilowatts (or carbon credits) are being generated or saved per customer instead of merely providing an estimate. Furthermore, embodiments of the present invention provide means for tracking the actual amount of deferred load and pollutants according to generation mix, serving utility and geographic area.

Embodiments of the present invention include an exemplary system for supporting a serving utility or power distributor (e.g., such as a municipality, electric cooperative, or any other wholesale or retail producer of electric power), methods for providing continuous, real time active power control in the system, and a method for determining how much actual load may be controlled at any given time for the purposes of conservation, alternative power generation and the creation of carbon (and other gaseous emissions) credits.

Additional embodiments of the present invention provide a system that implements the exemplary methods through the unique use of load information, location of customers consuming electricity, changes in state of controlled devices, current sensing, customer set points/preferences and artificial intelligence (e.g., as implemented through software) to optimize the presentation of load available to the serving utility for control.

Generally, the embodiments disclosed in the present invention are directed towards the real time (active) control of residential and commercial electrical devices that generally are 240V or less. However, specific features and functions may also be applicable to larger commercial installations that are greater than 240V. The description herein is intended to provide a practical implementation of real time load management for either voluntary or involuntary participants over large geographies and ideally for many serving electrical power producers, wholesalers or distributors. The exemplary methods and systems disclosed in the present invention may be implemented by an individual utility provider, or a third party monitoring service that tracks and manages power loading for one or more utilities. This application describes the necessary methods and generally describes software subsystems for both a host function (e.g., an active load director (ALD) server) and a companion active load client (ALC).

One embodiment of the present invention controls power distribution for a variety of electric utility companies by actively monitoring the amount of power needed by each utility and supplying the required power by redirecting power from participating customers. In this embodiment, customers agree to allow the power management system to disable certain power-consuming devices during peak loading times of the day. Smart breakers, which have the ability to be switched on or off remotely, are installed for specific devices in an electric service control panel accessed by a known IP address. Alternatively, IP-addressable smart appliances may be used. The power management system determines the amount of steady-state power each device consumes when turned on and logs the information in a database for each subscriber. For example, a current sensor on each smart appliance or within each smart breaker may measure the amount of current consumed by each monitored device. An active load client then multiplies the amount of current consumed by the operating voltage of the device to obtain the power consumption, and transmits the power consumption to the ALD server. When the serving utility needs more power than it is currently able to supply, the power load management system automatically adjusts the power distribution by turning off specific loads on an individual subscriber basis. Because the amount of power consumed by each specific load is known, the system can determine precisely which loads to turn off and tracks the power savings generated by each customer as a result of this short-term outage.

The present invention can be more readily understood with reference to FIGS. 1-8, in which like reference numerals designate like items. FIG. 1 depicts an exemplary IP-based active power load management system 10 in accordance with one embodiment of the present invention. The exemplary power management system 10 monitors and manages power distribution via an active load director (ALD) server 100 connected between one or more utility control centers (UCCs) 200 (one shown) and one or more active load clients (ALCs) 300 (one shown). The ALD server 100 may communicate with the utility control center 200 and each active load client 300 either directly or through a network 80 using the Internet Protocol (IP) or any other connection-based protocols. For example, the ALD server 100 may communicate using RF systems operating via one or more base stations 90 (one shown) using one or more wireless communication protocols, such as Global System for Mobile communications (GSM), Enhanced Data GSM Environment (EDGE), High Speed Packet Access (HSDPA), Time Division Multiple Access (TDMA), or Code Division Multiple Access data standards, including CDMA 2000, CDMA Revision A, and CDMA Revision B. Alternatively, or additionally, the ALD server 100 may communicate via a digital subscriber line (DSL) capable connection, cable television based IP capable connection, or any combination thereof. In the exemplary embodiment shown in FIG. 1, the ALD server 100 communicates with one or more active load clients 300 using a combination of traditional IP-based communication (e.g., over a trunked line) to a base station 90 and a wireless channel implementing the WiMax protocol for the "last mile" from the base station 90 to the active load client 300.

Each active load client 300 is accessible through a specified address (e.g., IP address) and controls and monitors the state of individual smart breaker modules or intelligent appliances 60 installed in the business or residence 20 to which the active load client 300 is associated (e.g., connected or supporting). Each active load client 300 is associated with a single residential or commercial customer. In one embodiment, the active load client 300 communicates with a residential load center 400 that contains smart breaker modules, which are able to switch from an "ON" (active) state to an "OFF" (inactive), and vice versa, responsive to signaling from the active load client 300. Smart breaker modules may include, for example, smart breaker panels manufactured by Schneider Electric SA under the trademark "Square D" or Eaton Corporation under the trademark "Cutler-Hammer" for installation during new construction. For retro-fitting existing buildings, smart breakers having means for individual identification and control may be used. Typically, each smart breaker controls a single appliance (e.g., a washer/dryer 30, a hot water heater 40, an HVAC unit 50, or a pool pump 70).

Additionally, the active load client 300 may control individual smart appliances directly (e.g., without communicating with the residential load center 300) via one or more of a variety of known communication protocols (e.g., IP, Broadband over PowerLine (BPL) in its various forms, including through specifications promulgated or being developed by the HOMEPLUG Powerline Alliance and the IEEE, Ethernet, Bluetooth, ZigBee, Wi-Fi, WiMax, etc.). Typically, a smart appliance 60 includes a power control module (not shown) having communication abilities. The power control module is installed in-line with the power supply to the appliance, between the actual appliance and the power source (e.g., the power control module is plugged into a power outlet at the home or business and the power cord for the appliance is plugged into the power control module). Thus, when the power control module receives a command to turn off the appliance 60, it disconnects the actual power supplying the appliance 60. Alternatively, a smart appliance 60 may include a power control module integrated directly into the appliance, which may receive commands and control the operation of the appliance directly (e.g., a smart thermostat may perform such functions as raising or lowering the set temperature, switching an HVAC unit on or off, or switching a fan on or off).

Figure 2:
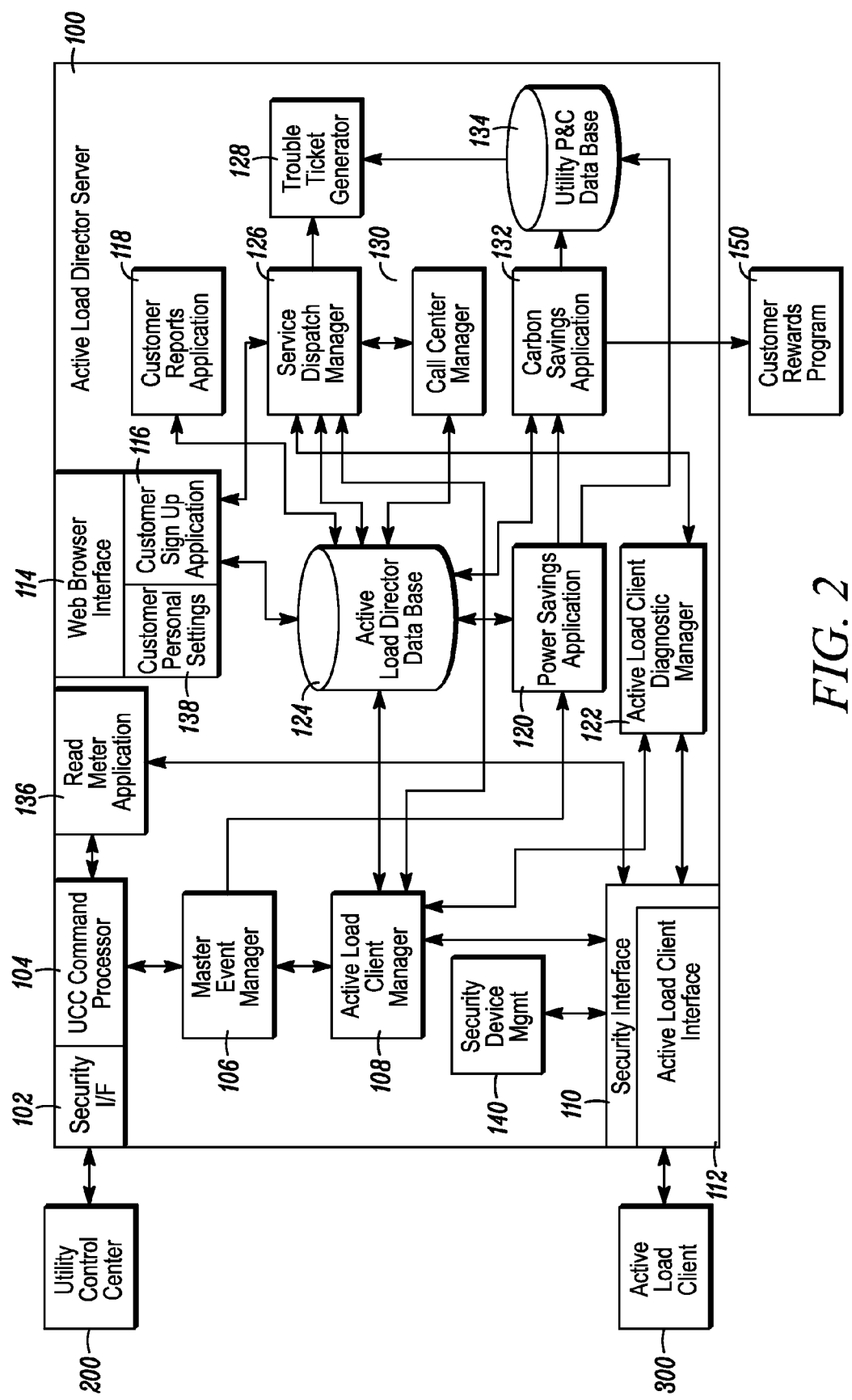
FIG. 2 is a block diagram illustrating an exemplary active load director (ALD) server as shown in the system of FIG. 1.

Referring now to FIG. 2, the ALD server 100 may serve as the primary interface to customers, as well as to service personnel. In the exemplary embodiment depicted in FIG. 2, the ALD server 100 includes a utility control center (UCC) security interface 102, a UCC command processor 104, a master event manager 106, an ALC manager 108, an ALC security interface 110, an ALC interface 112, a web browser interface 114, a customer sign-up application 116, customer personal settings 138, a customer reports application 118, a power savings application 120, an ALC diagnostic manager 122, an ALD database 124, a service dispatch manager 126, a trouble ticket generator 128, a call center manager 130, a carbon savings application 132, a utility P & C database 134, a read meter application 136, and a security device manager 140.

Using the web browser interface 114, in one embodiment, customers interact with the ALD server 100 and subscribe to some or all of the services offered by the power load management system 10 via a customer sign-up application 116. In accordance with the customer sign-up application 116, the customer specifies customer personal settings 138 that contain information relating to the customer and the customer's residence or business, and defines the extent of service to which the customer wishes to subscribe. Additional details of the customer sign-up application 116 are discussed below. Customers may also use the web browser interface 114 to access and modify information pertaining to their existing accounts.

The ALD server 100 also includes a UCC security interface 102 which provides security and encryption between the ALD server 100 and a utility company's control center 200 to ensure that no third party is able to provide unauthorized directions to the ALD server 100. A UCC command processor 104 receives and sends messages between the ALD server 100 and the utility control center 200. Similarly, an ALC security interface 110 provides security and encryption between the ALD server 100 and each active load client 300 on the system 10, ensuring that no third parties can send directions to, or receive information from, the active load client 300. The security techniques employed by the ALC security interface 110 and the UCC security interface 102 may include conventional symmetric key or asymmetric key algorithms, such as Wireless Encryption Protocol (WEP), Wi-Fi Protected Access (WPA and WPA2), Advanced Encryption Standard (AES), Pretty Good Privacy (PGP), or proprietary encryption techniques.

In one embodiment, the commands that can be received by the UCC command processor 104 from the electric utility's control center 200 include a "Cut" command, a "How Much" command, an "End Event" command, and a "Read Meters" command. The "Cut" command instructs the ALD server 100 to reduce a specified amount of power for a specified amount of time. The specified amount of power may be an instantaneous amount of power or an average amount of power consumed per unit of time. The "Cut" command may also optionally indicate general geographic areas or specific locations for power load reduction. The "How Much" command requests information for the amount of power (e.g., in megawatts) that can be reduced by the requesting utility control center 200. The "End Event" command stops the present ALD server 100 transaction. The "Read Meters" command instructs the ALD server 100 to read the meters for all customers serviced by the requesting utility.

The UCC command processor 104 may send a response to a "How Much" command or an "Event Ended" status confirmation to a utility control center 200. A response to a "How Much" command returns an amount of power that can be cut. An "Event Ended" acknowledgement message confirms that the present ALD server transaction has ended.

The master event manager 106 maintains the overall status of the power load activities controlled by the power management system 10. The master event manager 106 maintains a separate state for each utility that is controlled and tracks the current power usage within each utility. The master event manager 106 also tracks the management condition of each utility (e.g., whether or not each utility is currently being managed). The master event manager 106 receives instructions in the form of transaction requests from the UCC command processor 104 and routes instructions to components necessary to complete the requested transaction, such as the ALC manager 108 and the power savings application 120.

The ALC manager 108 routes instructions between the ALD server 100 and each active load client 300 within the system 10 through an ALC interface 112. For instance, the ALC manager 108 tracks the state of every active load client 300 serviced by specified utilities by communicating with the active load client 300 through an individual IP address. The ALC interface 112 translates instructions (e.g., transactions) received from the ALC manager 108 into the proper message structure understood by the targeted active load client 300 and then sends the message to the active load client 300. Likewise, when the ALC interface 112 receives messages from an active load client 300, it translates the message into a form understood by the ALC manager 108 and routes the translated message to the ALC manager 108.

The ALC manager 108 receives from each active load client 300 that it services, either periodically or responsive to polling messages sent by the ALC manager 108, messages containing the present power consumption and the status (e.g., "ON" or "OFF") of each device controlled by the active load client 300. Alternatively, if individual device metering is not available, then the total power consumption and load management status for the entire active load client 300 may be reported. The information contained in each status message is stored in the ALD database 124 in a record associated with the specified active load client 300. The ALD database 124 contains all the information necessary to manage every customer account and power distribution. In one embodiment, the ALD database 124 contains customer contact information, such as names, addresses, phone numbers, email addresses, and associated utility companies for all customers having active load clients 300 installed at their residences or businesses, as well as a description of specific operating instructions for each managed device (e.g., IP-addressable smart breaker or appliance), device status, and device diagnostic history.

There are several types of messages that the ALC manager 108 may receive from an active load client 300 and process accordingly. One such message is a security alert message. A security alert message originates from an optional security or safety monitoring system installed in the residence or business and coupled to the active load client 300 (e.g., wirelessly or via a wired connection). When a security alert message is received, the ALC manager 108 accesses the ALD database 124 to obtain routing information for determining where to send the alert, and then sends the alert as directed. For example, the ALD manager 108 may be programmed to send the alert or another message (e.g., an electronic mail message or a pre-recorded voice message) to a security monitoring service company and/or the owner of the residence or business.

Another message communicated between an active load client 300 and the ALC manager 108 is a report trigger message. A report trigger message alerts the ALD server 100 that a predetermined amount of power has been consumed by a specific device monitored by an active load client 300. When a report trigger message is received from an active load client 300, the ALC manager 108 logs the information contained in the message in the ALD database 124 for the customer associated with the information-supplying active load client 300. The power consumption information is then used by the ALC manager 108 to determine the active load client(s) 300 to which to send a power reduction or "Cut" message during a power reduction event.

Yet another message exchanged between an active load client 300 and the ALC manager 108 is a status response message. A status response message reports the type and status of each device controlled by the active load client 300 to the ALD server 100. When a status response message is received from an active load client 300, the ALC manager 108 logs the information contained in the message in the ALD database 124.

In one embodiment, upon receiving instructions (e.g., a "Cut" instruction) from the master event manager 106 to reduce power consumption for a specified utility, the ALC manager 108 determines which active load clients 300 and/or individually controlled devices to switch to the "OFF" state based upon present power consumption data stored in the ALD database 124. The ALC manager 108 then sends a message to each selected active load client 300 containing instructions to turn off all or some of the devices under the active load client's control.

In another embodiment, a power savings application 120 may be optionally included to calculate the total amount of power saved by each utility during a power reduction event (referred to herein as a "Cut event"), as well as the amount of power saved for each customer whose active load client 300 reduced the amount of power delivered. The power savings application 120 accesses the data stored in the ALD database 124 for each customer serviced by a particular utility and stores the total cumulative power savings (e.g., in megawatts per hour) accumulated by each utility for each Cut event in which the utility participated as an entry in the utility Power and Carbon ("P&C") database 134.

In a further embodiment, an optional carbon savings application 132 uses the information produced by the power savings application 120 to determine the amount of carbon saved by each utility and by each customer for every Cut event. Carbon savings information (e.g., type of fuel that was used to generate power for the customer set that was included in the just completed event, power saved in the prior event, governmental standard calculation rates, and/or other data, such as generation mix per serving utility and geography of the customer's location and the location of the nearest power source) is stored in the ALD database 124 for each active load client 300 (customer) and in the utility P&C database 134 for each utility. The carbon savings application 132 calculates the total equivalent carbon credits saved for each active load client 300 (customer) and utility participating in the previous Cut event, and stores the information in the ALD database 124 and the utility P&C database 134, respectively.

Additionally, the ALC manager 108 automatically provides for smooth operation of the entire power load management system 10 by optionally interacting with a service dispatch manager 126. For example, when a new customer subscribes to participate in the power load management system 10, the service dispatch manager 126 is notified of the new subscription from the customer sign-up application 116. The service dispatch manager 126 then sends an activation request to the ALC manager 108. Upon receiving the activation request from the service dispatch manager 126, the ALC manager 108 may sends a query request for information to the new active load client 300 and, upon receipt of the information, provides it to the service dispatch manager 126. Additionally, if at any time the ALC manager 108 detects that a particular active load client 300 is not functioning properly, the ALC manager 108 may send a request for service to the service dispatch manager 126 to arrange for a service call to correct the problem.

In another embodiment, the service dispatch manager 126 may also receive requests for service from a call center manager 130 that provides support to an operations center (not shown), which receives telephone calls from customers of the power load management system 10. When a customer calls the operations center to request service, the call center manager 130 logs the service call in the ALD database 124 and sends a "Service" transaction message to the service dispatch manager 126. When the service call has been completed, the call center manager 130 receives a completed notification from the service dispatch manager 126 and records the original service call as "closed" in the ALD database 124.

In yet another embodiment, the service dispatch manager 126 may also instruct an ALC diagnostic manager 122 to perform a series of diagnostic tests for any active load client 300 for which the service dispatch manager 126 has received a service request. After the ALC diagnostic manager 122 has performed the diagnostic procedure, it returns the results to the service dispatch manager 126. The service dispatch manager 126 then invokes a trouble ticket generator 128 to produce a report (e.g., trouble ticket) that includes information (some of which was retrieved by the service dispatch manager 126 from the ALD database 124) pertaining to the required service (e.g., customer name, address, any special consideration for accessing the necessary equipment, and the results of the diagnostic process). A residential customer service technician may then use the information provided in the trouble ticket to select the type of equipment and replacement parts necessary for performing a service call.

A read meter application 136 may be optionally invoked when the UCC command processor 104 receives a "Read Meters" or equivalent command from the utility control center 200. The read meter application 136 cycles through the ALD database 124 and sends a read meter message or command to each active load client 300, or those active load clients 300 specifically identified in the UCC's command, via the ALC manager 108. The information received by the ALC manager 108 from the active load client 300 is logged in the ALD database 124 for each customer. When all the active load client meter information has been received, the information is sent to the requesting utility control center 200 using a business to business (e.g., ebXML) or other desired protocol.

The optional security device management block 140 includes program instructions for handling security system messages received by the security interface 110. The security device management block 140 includes routing information for all security system messages and may further include messaging options on a per customer or service company basis. For example, one security service may require an email alert from the ALD server 100 upon the occurrence of a security event; whereas, another security service may require that the message sent from the in-building system be passed on by the active load client 300 and the ALD server 100 directly to the security service company.

In a further embodiment, the ALD server 100 also includes a customer reports application 118 that generates reports to be sent to individual customers detailing the amount of power saved during a previous billing cycle. Each report may contain a cumulative total of power savings over the prior billing cycle, details of the amount of power saved per controlled device (e.g., breaker or appliance), power savings from utility directed events, power savings from customer directed events, devices being managed, total carbon equivalents used and saved during the period, and/or specific details for each Cut event in which the customer's active load client 300 participated. Customers may also receive incentives and awards for participation in the power load management system 10 through a customer rewards program 150. For example, the utilities or a third party system operator may enter into agreements with product and/or service providers to offer system participants discounts on products and services offered by the providers based upon certain participation levels or milestones. The rewards program 150 may be setup in a manner similar to conventional frequent flyer programs in which points are accumulated for power saved (e.g., one point for each megawatt saved or deferred) and, upon accumulation of predetermined levels of points, the customer can select a product or service discount. Alternatively, a serving utility may offer a customer a rate discount for participating in the system 10.

Figure 3:
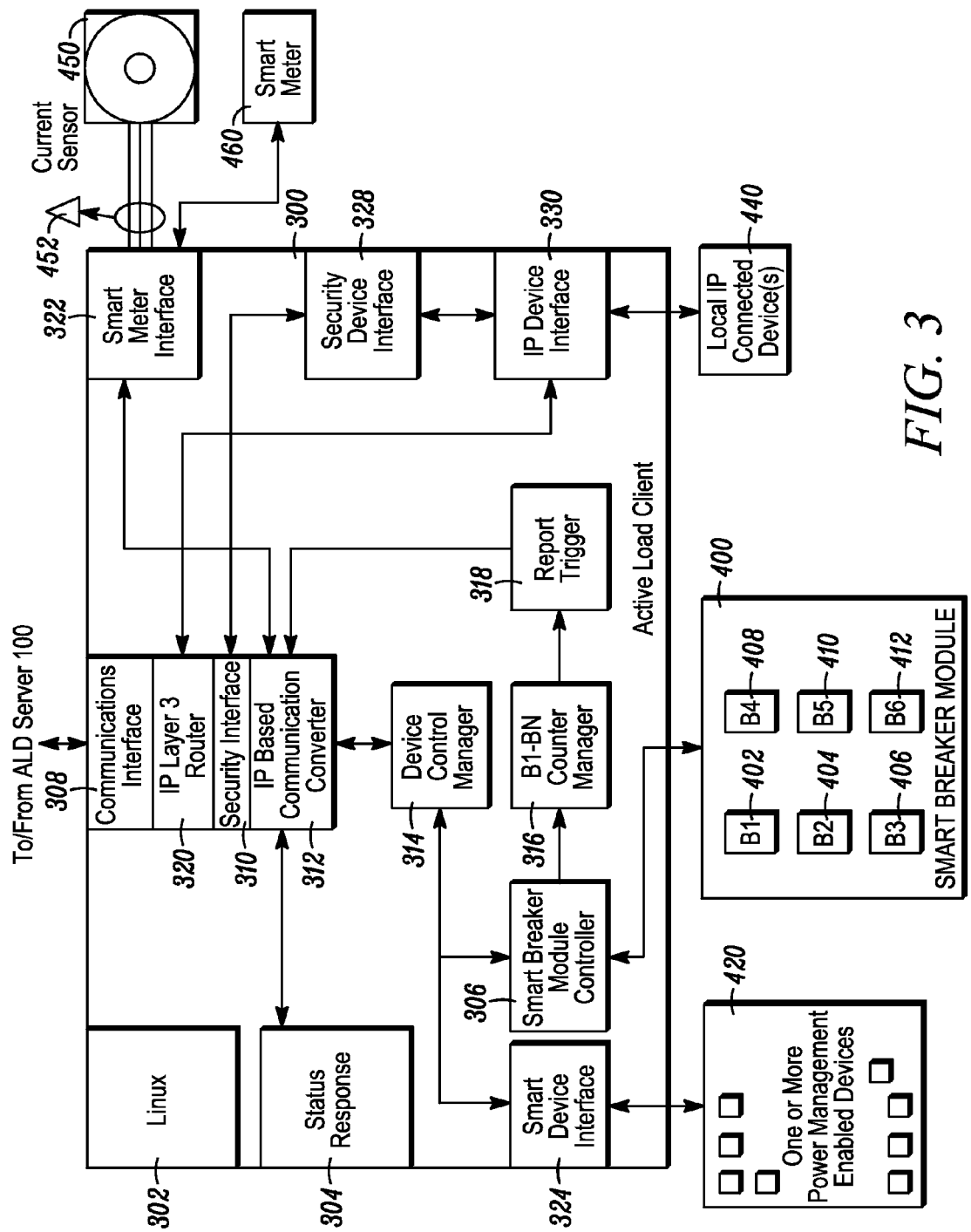
FIG. 3 is a block diagram illustrating an exemplary active load client and smart breaker module as shown in the system of FIG. 1.

FIG. 3 illustrates a block diagram of an exemplary active load client 300 in accordance with one embodiment of the present invention. The depicted active load client 300 includes a Linux-based operating system 302, a status response generator 304, a smart breaker module controller 306, a smart device interface 324, a communications interface 308, a security interface 310, an IP-based communication converter 312, a device control manager 314, a smart breaker (B1-BN) counter manager 316, a report trigger application 318, an IP router 320, a smart meter interface 322, a security device interface 328, and an IP device interface 330. The active load client 300, in this embodiment, is a computer or processor-based system located on-site at a customer's residence or business. The primary function of the active load client 300 is to manage the power load levels of controllable devices located at the residence or business, which the active load client 300 oversees on behalf of the customer. In an exemplary embodiment, the software running on the active load client 300 operates using the Linux embedded operating system 302 to manage the hardware and the general software environment. One skilled in the art will readily recognize that other operating systems, such as Microsoft's family of operating systems, Mac OS, and Sun OS, among others, may be alternatively used. Additionally, the active load client 300 may include DHCP client functionality to enable the active load client 300 to dynamically request IP addresses for itself and/or one or more controllable devices 402-412, 420, 460 managed thereby from a DHCP server on the host IP network facilitating communications between the active load client 300 and the ALD server 100. The active load client 300 may further include router functionality and maintain a routing table of assigned IP addresses in a memory of the active load client 300 to facilitate delivery of messages from the active load client 300 to the controllable devices 402-412, 420, 460.

A communications interface 308 facilitates connectivity between the active load client 300 and the ALD server 100. Communication between the active load client 300 and the ALD server 100 may be based on any type of IP or other connection protocol, including but not limited to, the WiMax protocol. Thus, the communications interface 308 may be a wired or wireless modem, a wireless access point, or other appropriate interface.

A standard IP Layer-3 router 320 routes messages received by the communications interface 308 to both the active load client 300 and to any other locally connected device 440. The router 320 determines if a received message is directed to the active load client 300 and, if so, passes the message to a security interface 310 to be decrypted. The security interface 310 provides protection for the contents of the messages exchanged between the ALD server 100 and the active load client 300. The message content is encrypted and decrypted by the security interface 310 using, for example, a symmetric encryption key composed of a combination of the IP address and GPS data for the active load client 300 or any other combination of known information. If the message is not directed to the active load client 300, then it is passed to the IP device interface 330 for delivery to one or more locally connected devices 440. For example, the IP router 320 may be programmed to route power load management system messages as well as conventional Internet messages. In such a case, the active load client 300 may function as a gateway for Internet service supplied to the residence or business instead of using separate Internet gateways or routers.

An IP based communication converter 312 opens incoming messages from the ALD server 100 and directs them to the appropriate function within the active load client 300. The converter 312 also receives messages from various active load client 300 functions (e.g., a device control manager 314, a status response generator 304, and a report trigger application 318), packages the messages in the form expected by the ALD server 100, and then passes them on to the security interface 310 for encryption.

The device control manager 314 processes power management commands for various controllable devices logically connected to the active load client 300. The devices can be either smart breakers 402-412 or other IP based devices 420, such as smart appliances with individual control modules (not shown). The device control manager 314 also processes "Query Request" or equivalent commands or messages from the ALD server 100 by querying a status response generator 304 which maintains the type and status of each device controlled by the active load client 300, and providing the statuses to the ALD server 100. The "Query Request" message may include information other than mere status requests, such as temperature set points for thermally controlled devices, time intervals during which load control is permitted or prohibited, dates during which load control is permitted or prohibited, and priorities of device control (e.g., during a power reduction event, hot water heater and pool pump are turned off before HVAC unit is turned off). If temperature set points or other non-status information are included in a "Query Request" message and there is a device attached to the active load client 300 that can process the information, the temperature set points or other information are sent to that device 420 via a smart device interface 324.

The status response generator 304 receives status messages from the ALD server 100 and, responsive thereto, polls each controllable device 402-412, 420, 460 under the active load client's control to determine whether the controllable device 402-412, 420, 460 is active and in good operational order. Each controllable device 402-412, 420, 460 responds to the polls with operational information (e.g., activity status and/or error reports) in a status response message. The active load client 300 stores the status responses in a memory associated with the status response generator 304 for reference in connection with power reduction events.

The smart device interface 324 facilitates IP or other address-based communications to individual devices 420 (e.g., smart appliance power control modules) that are attached to the active load client 300. The connectivity can be through one of several different types of networks, including but not limited to, BPL, ZigBee, Wi-Fi, Bluetooth, or direct Ethernet communications. Thus, the smart device interface 324 is a modem adapted for use in or on the network connecting the smart devices 420 to the active load client 300. The smart device interface 324 also allows the device control manager 314 to manage those devices that have the capability to sense temperature settings and respond to temperature variations.

The smart breaker module controller 306 formats, sends, and receives messages, including power control instructions, to and from the smart breaker module 400. In one embodiment, the communications is preferably through a BPL connection. In such embodiment, the smart breaker module controller 306 includes a BPL modem and operations software. The smart breaker module 400 contains individual smart breakers 402-412, wherein each smart breaker 402-412 includes an applicable modem (e.g., a BPL modem when BPL is the networking technology employed) and is preferably in-line with power supplied to a single appliance or other device. The B1-BN counter manager 316 determines and stores real time power usage for each installed smart breaker 402-412. For example, the counter manager 316 tracks or counts the amount of power used by each smart breaker 402-412 and stores the counted amounts of power in a memory of the active load client 300 associated with the counter manager 316. When the counter for any breaker 402-412 reaches a predetermined limit, the counter manager 316 provides an identification number corresponding to the smart breaker 402-412 and the corresponding amount of power (power number) to the report trigger application 318. Once the information is passed to the report trigger application 318, the counter manager 316 resets the counter for the applicable breaker 402-412 to zero so that information can once again be collected. The report trigger application 318 then creates a reporting message containing identification information for the active load client 300, identification information for the particular smart breaker 402-412, and the power number, and sends the report to the IP based communication converter 312 for transmission to the ALD server 100.

The smart meter interface 322 manages either smart meters 460 that communicate using BPL or a current sensor 452 connected to a traditional power meter 450. When the active load client 300 receives a "Read Meters" command or message from the ALD server 100 and a smart meter 460 is attached to the active load client 300, a "Read Meters" command is sent to the meter 460 via the smart meter interface 322 (e.g., a BPL modem). The smart meter interface 322 receives a reply to the "Read Meters" message from the smart meter 460, formats this information along with identification information for the active load client 300, and provides the formatted message to the IP based communication converter 312 for transmission to the ALD server 100.

A security device interface 328 transfers security messages to and from any attached security device. For example, the security device interface 328 may be coupled by wire or wirelessly to a monitoring or security system that includes motion sensors, mechanical sensors, optical sensors, electrical sensors, smoke detectors, carbon monoxide detectors, and/or other safety and security monitoring devices. When the monitoring system detects a security or safety problem (e.g., break-in, fire, excessive carbon monoxide levels), the monitoring system sends its alarm signal to the security interface 328, which in turn forwards the alarm signal to the IP network through the ALD server 100 for delivery to the target IP address (e.g., the security monitoring service provider). The security device interface 328 may also be capable of communicating with the attached security device through the IP device interface to recognize a notification message from the device that it has lost its line based telephone connection. Once that notification has been received, an alert message is formatted and sent to the ALD server 100 through the IP based communication converter 312.

Operation of the power management system 10 in accordance with exemplary embodiments will now be described. In one embodiment, customers initially sign up for power load management services using a web browser. Using the web browser, the customer accesses a power management system provider's website through the web browser interface 114 and provides his or her name and address information, as well as the type of equipment he or she would like to have controlled by the power load management system 10 to save energy at peak load times and to accumulate power savings or carbon credits (which may be used to receive reward incentives based upon the total amount of power or carbon saved by the customer). The customer may also agree to allow management of power consumption during non-peak times to sell back excess power to the utility, while simultaneously accumulating power savings or carbon credits.

The customer sign up application 116 creates a database entry for each customer in the ALD database 124. Each customer's contact information and load management preferences are stored or logged in the database 124. For example, the customer may be given several simple options for managing any number of devices or class of devices, including parameters for managing the devices (e.g., how long each type of device may be switched off and/or define hours when the devices may not be switched off at all). In particular, the customer may also be able to provide specific parameters for HVAC operations (e.g., set control points for the HVAC system specifying both the low and high temperature ranges). Additionally, the customer may be given an option of receiving a notification (e.g., an email message, Instant Message, Text Message, or recorded phone call, or any combination thereof) when a power management event occurs. When the customer completes entering data, a "New Service" or equivalent transaction message or command is sent to the service dispatch manager 126.

Figure 4:
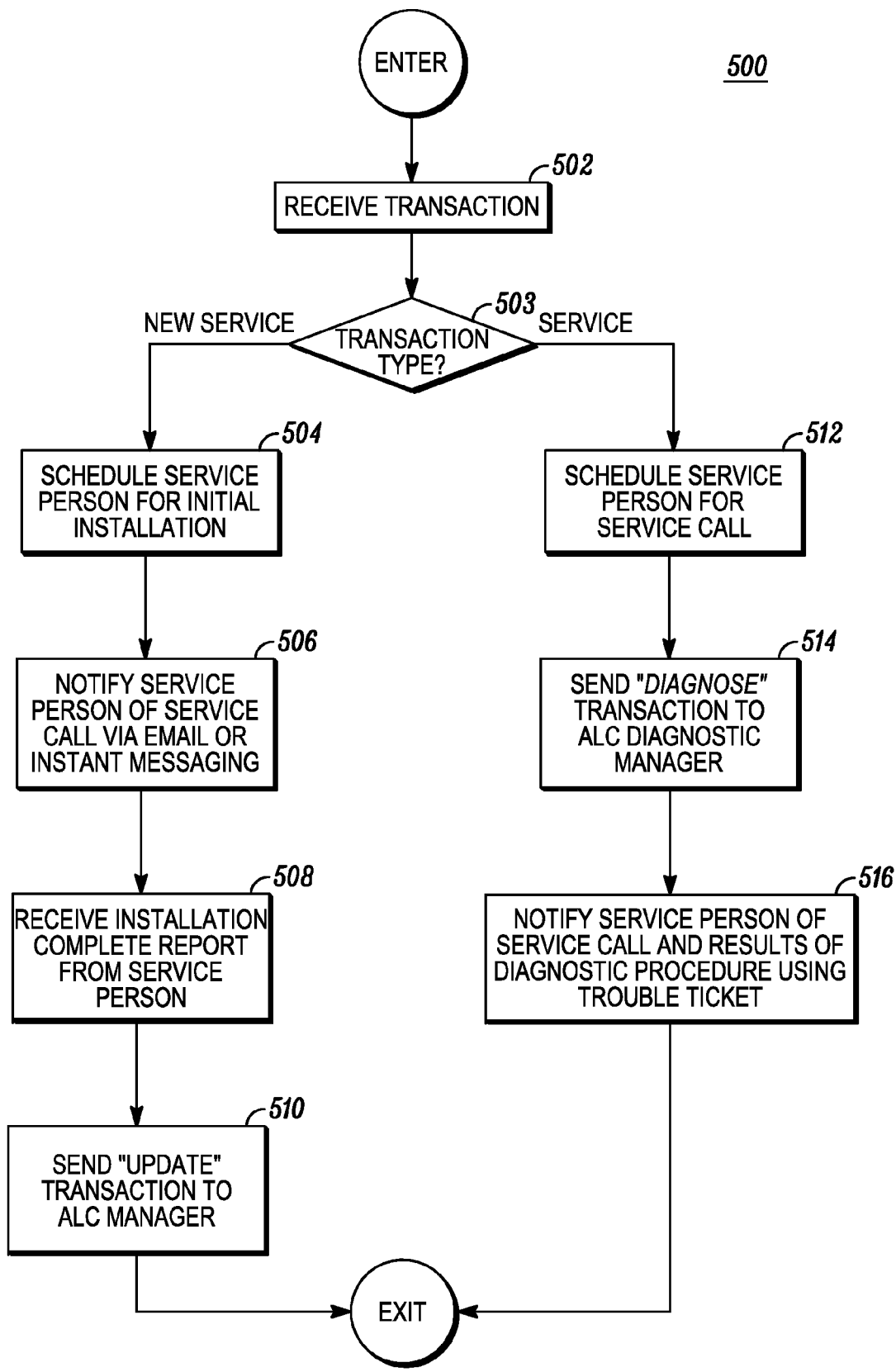
FIG. 4 is an operational flow diagram illustrating a method for automatically scheduling service calls in an active power load management system in accordance with one exemplary embodiment of the present invention.

FIG. 4 illustrates an exemplary operational flow diagram 500 providing steps executed by the ALD server 100 (e.g., as part of the service dispatch manager 126) to manage service requests in the exemplary power load management system 10, in accordance with one embodiment of the present invention. The steps of FIG. 4 are preferably implemented as a set of computer instructions (software) stored in a memory (not shown) of the ALD server 100 and executed by one or more processors (not shown) of the ALD server 100. Pursuant to the logic flow, the service dispatch manager 126 receives (502) a transaction message or command and determines (503) the type of transaction. Upon receiving a "New Service" transaction message, the service dispatch manager 126 schedules (504) a service person (e.g., technician) to make an initial installation visit to the new customer. The service dispatch manager 126 then notifies (506) the scheduled service person, or dispatcher of service personnel, of an awaiting service call using, for example, email, text messaging, and/or instant messaging notifications.

In one embodiment, responsive to the service call notification, the service person obtains the new customer's name and address, a description of the desired service, and a service time from a service dispatch manager service log. The service person obtains an active load client 300, all necessary smart breaker modules 402-412, and all necessary smart switches to install at the customer location. The service person notes any missing information from the customer's database information (e.g., the devices being controlled, type make and model of each device, and any other information the system will need to function correctly). The service person installs the active load client 300 and smart breakers 402-412 at the new customer's location. A global positioning satellite (GPS) device may optionally be used by the service person to determine an accurate geographic location of the new customer building, which will be added to the customer's entry in the ALD database 124 and may be used to create a symmetric encryption key to facilitate secure communications between the ALD server 100 and the active load client 300. The physical location of the installed active load client 300 is also entered into the customer's entry. Smart switch devices may be installed by the service person or left at the customer location for installation by the customer. After the active load client 300 has been installed, the service dispatch manager 126 receives (508) a report from the service person, via a service log, indicating that the installation is complete. The service dispatch manager 126 then sends (510) an "Update" or equivalent transaction message to the ALC manager 108.

Returning to block 503, when a "Service" or similar transaction message or command is received, the service dispatch manager 126 schedules (512) a service person to make a service call to the specified customer. The service dispatch manager 126 then sends (514) a "Diagnose" or similar transaction to the ALC diagnostic manager 122. The ALC diagnostic manager 122 returns the results of the diagnostic procedure to the service dispatch manager 126, which then notifies (516) the service person of the service call and provides him or her with the results of the diagnostic procedure using a conventional trouble ticket. The service person uses the diagnostic procedure results in the trouble ticket to select the type of equipment and replacement parts necessary for the service call.

Figure 5:
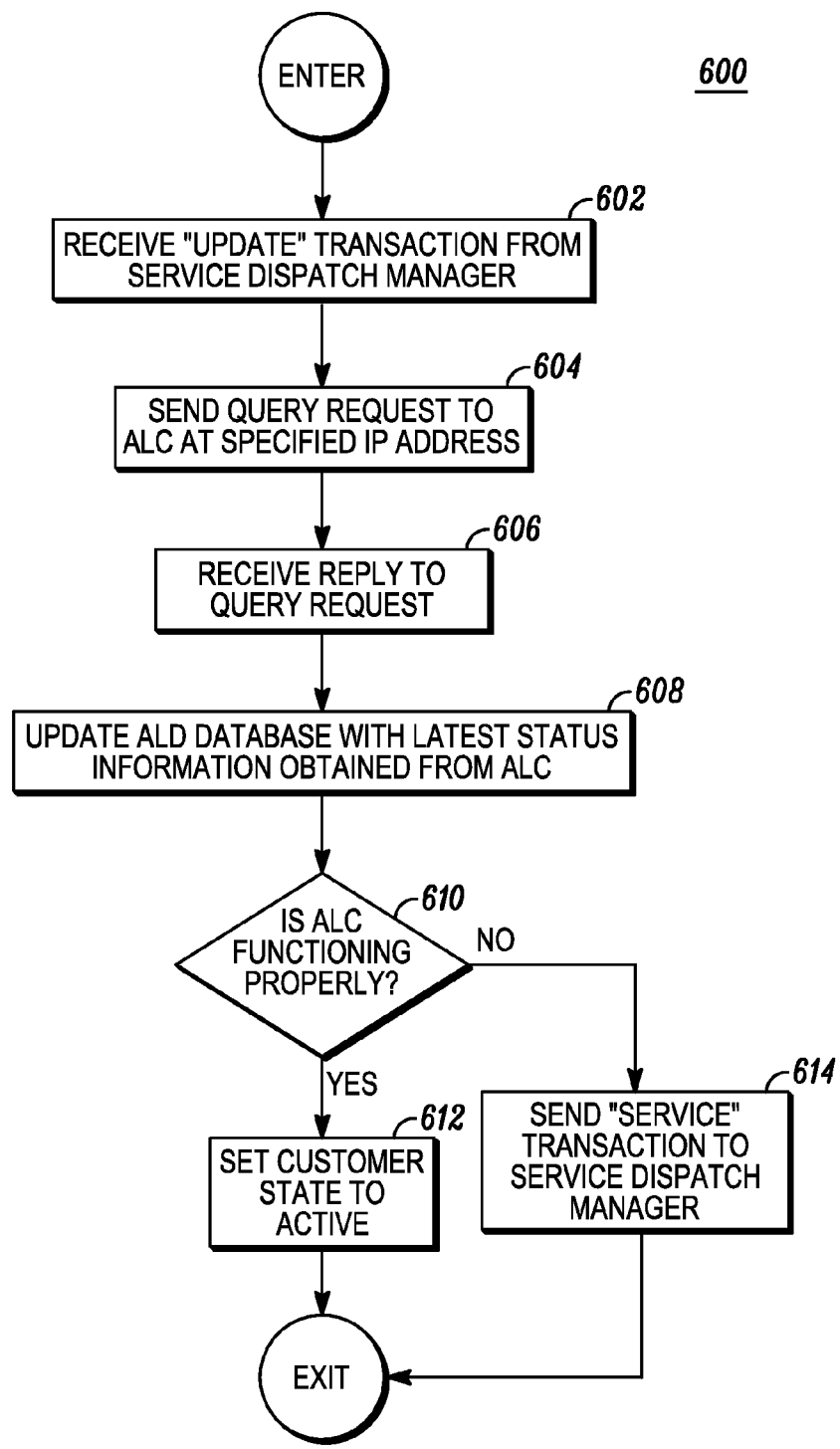
FIG. 5 is an operational flow diagram illustrating a method for activating new subscribers in an active power load management system in accordance with another exemplary embodiment of the present invention.

FIG. 5 illustrates an exemplary operational flow diagram 600 providing steps executed by the ALD server 100 (e.g., as part of the ALC manager 108) to confirm customer sign-up to the power load management system 10, in accordance with one embodiment of the present invention. The steps of FIG. 5 are preferably implemented as a set of computer instructions (software) stored in a memory (not shown) of the ALD server 100 and executed by one or more processors (not shown) of the ALD server 100. In accordance with the logic flow, the ALC manager 108 receives (602) an "Update" or similar transaction message or command from the service dispatch manager 126 and uses the IP address specified in the "Update" message to send (604) out a "Query Request" or similar message or command to the active load client 300. The "Query Request" message includes a list of devices the ALD server 100 expects to be managed. If the customer information input at customer sign-up includes temperature set points for one or more load-controllable devices, that information is included in the "Query Request" message. The ALC manager 108 receives (606) a query reply containing information about the active load client 300 (e.g., current WiMax band being used, operational state (e.g., functioning or not), setting of all the counters for measuring current usage (e.g., all are set to zero at initial set up time), status of devices being controlled (e.g., either switched to the "on" state or "off" state)). The ALC manager 108 updates (608) the ALD database 124 with the latest status information obtained from the active load client 300. If the ALC manager 108 detects (610), from the query reply, that the active load client 300 is functioning properly, it sets (612) the customer state to "active" to allow participation in ALD server activities. However, if the ALC manager 108 detects (610) that the active load client 300 is not functioning properly, it sends (614) a "Service" or similar transaction message or command to the service dispatch manager 126.

Figure 6:
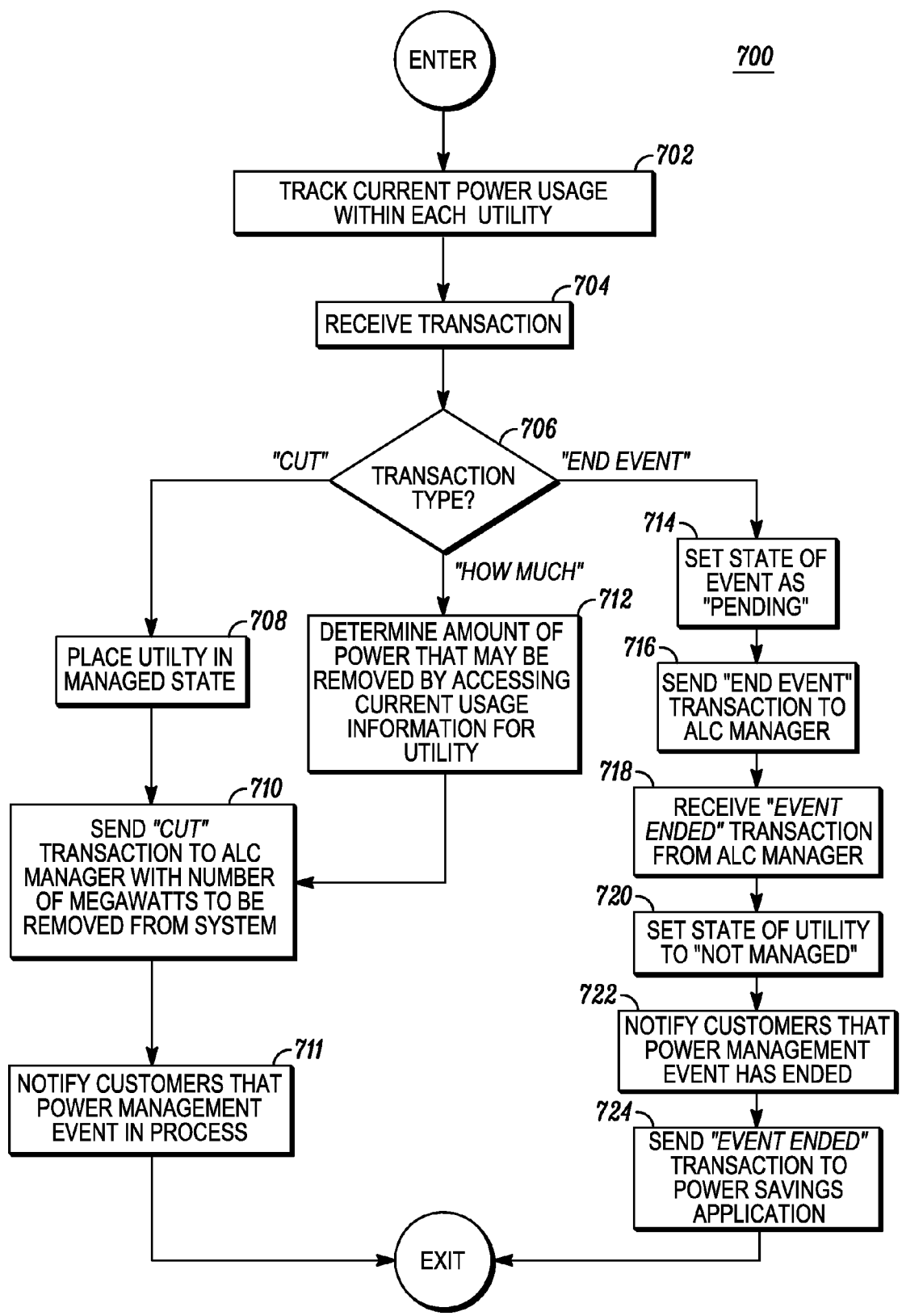
FIG. 6 is an operational flow diagram illustrating a method for managing events occurring in an active power load management system in accordance with yet another exemplary embodiment of the present invention.

FIG. 6 illustrates an exemplary operational flow diagram 700 providing steps executed by the ALD server 100 (e.g., as part of the master event manager 106) to manage events in the exemplary power load management system 10, in accordance with one embodiment of the present invention. The steps of FIG. 6 are preferably implemented as a set of computer instructions (software) stored in a memory (not shown) of the ALD server 100 and executed by one or more processors (not shown) of the ALD server 100. Pursuant to the logic flow, the master event manager 106 tracks (702) current power usage within each utility being managed by the ALD server 100. When the master event manager 106 receives (704) a transaction message or command from the UCC command processor 104 or the ALC manager 108, the master event manager 106 determines (706) the type of transaction received. Upon receiving a "Cut" transaction from the UCC command processor 104 (resulting from a "Cut" command issued by the utility control center 200), the master event manager 106 places (708) the utility in a managed logical state. The master event manager then sends (710) a "Cut" transaction or event message or command to the ALC manager 108 identifying the amount of power (e.g., in megawatts) that must be removed from the power system supplied by the utility. The amount of power specified for reduction in a "Cut" command may be an instantaneous amount of power or an average amount of power per unit time. Finally, the master event manager 106 notifies (711) every customer that has chosen to receive a notification (e.g., through transmission of an email or other pre-established notification technique) that a power management event is in process.

Returning to block 706, when the master event manager 106 receives a "How Much" or other equivalent power inquiry transaction message or command from the UCC command processor 104 (resulting from a "How Much" or equivalent power inquiry command issued by the utility control center 200), the master event manager 106 determines (712) the amount of power that may be temporarily removed from a particular utility's managed system by accessing the current usage information for that utility. The current usage information is derived, in one embodiment, by aggregating the total available load for the serving utility, as determined from the customer usage information for the utility stored in the ALD database 124, based on the total amount of power that may have to be supplied to the utility's customers in view of the statuses of each of the active load clients 300 and their respectively controllable load devices 402-412, 420, 460 during the load control interval identified in the "How Much" message.

Each utility may indicate a maximum amount of power or maximum percentage of power to be reduced during any power reduction event. Such maximums or limits may be stored in the utility P&C database 134 of the ALD server 100 and downloaded to the master event manager 106. In one embodiment, the master event manager 106 is programmed to remove a default one percent (1%) of the utility's current power consumption during any particular power management period (e.g., one hour). In alternative embodiments, the master event manager 106 may be programmed to remove other fixed percentages of current power consumption or varying percentages of current power consumption based on the current power consumption (e.g., 1% when power consumption is at system maximum and 10% when power consumption is at only 50% of system maximum). Based on the amount of power to be removed, the master event manager 106 sends (710) a "Cut" or equivalent event message to the ALC manager 108 indicating the amount of power (e.g., in megawatts) that must be removed from the utility's power system (e.g., 1% of the current usage), and notifies (711) all customers that have chosen to receive a notification that a power management event is in process. The master event manager 106 also sends a response to the utility control center 200 via the UCC command processor 104 advising the utility control center 200 as to the quantity of power that can be temporarily reduced by the requesting utility.

Returning once again to block 706, when the master event manager 106 receives an "End Event" or equivalent transaction message or command from the UCC command processor 104 (resulting from an "End Event" command issued by the utility control center 200), the master event manager 106 sets (714) the state of the current event as "Pending" and sends (716) an "End Event" or equivalent transaction message or command to the ALC manager 108. When the ALC manager 108 has performed the steps necessary to end the present event (e.g., a power reduction or Cut event), the master event manager 106 receives (718) an "Event Ended" or equivalent transaction from the ALC manager 108 and sets (720) the utility to a logical "Not Managed" state. The master event manager 106 then notifies (722) each customer that has chosen to receive a notification (e.g., through transmission of an email or other pre-established notification mechanism) that the power management event has ended. Finally, the master event manager 106 sends an "Event Ended" or equivalent transaction message or command to the power savings application 120 and the utility control center 200 (via the UCC command processor 104).

Figure 7:
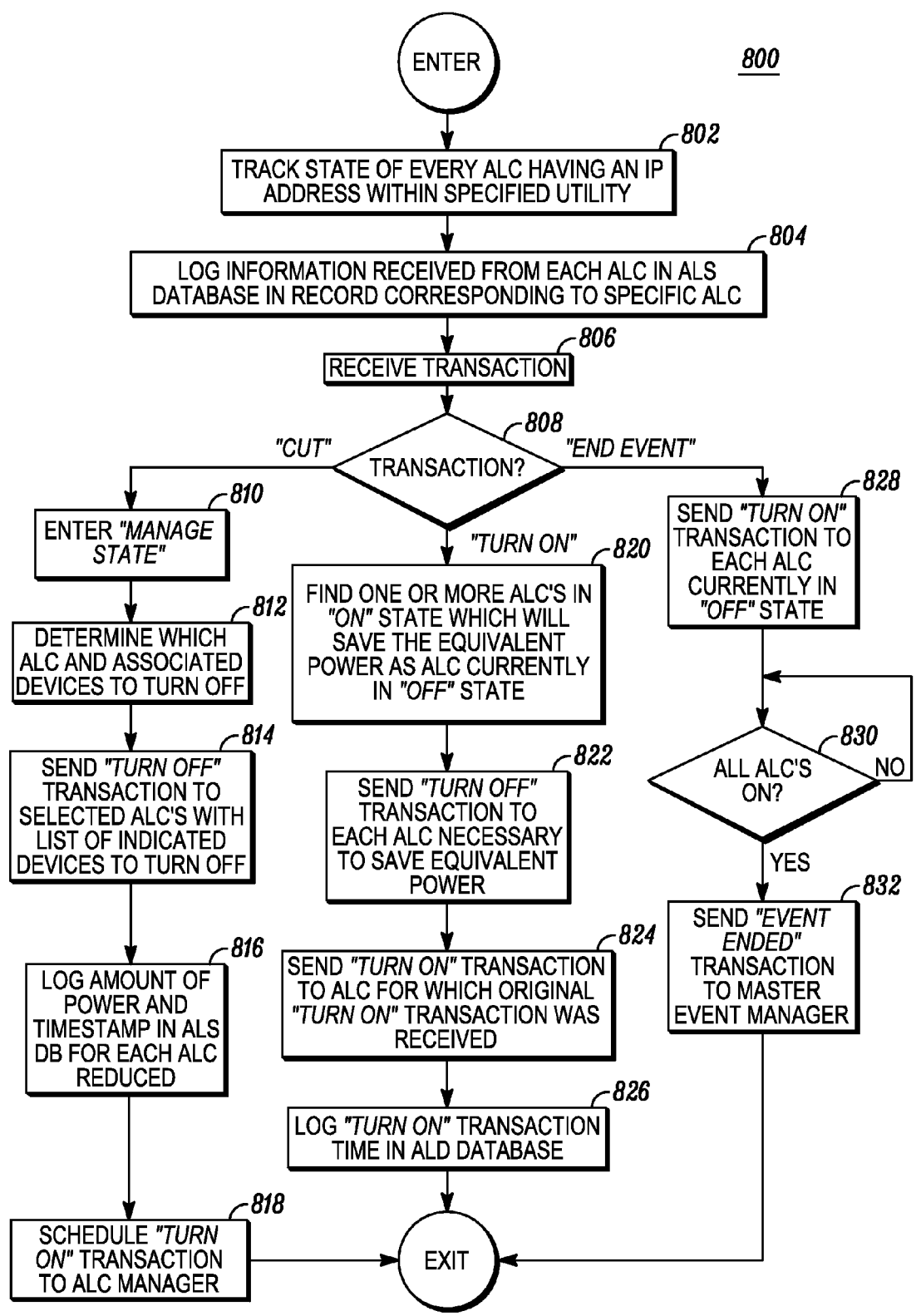
FIG. 7 is an operational flow diagram illustrating a method for actively reducing consumed power and tracking power savings on an individual customer basis in an active power load management system in accordance with another exemplary embodiment of the present invention.

Turning now to FIG. 7, exemplary operational flow diagram 800 illustrates steps executed by the ALD server 100 (e.g., as part of the ALC manager 108) to manage power consumption in the exemplary power load management system 10, in accordance with one embodiment of the present invention. The steps of FIG. 7 are preferably implemented as a set of computer instructions (software) stored in a memory of the ALD server 100 and executed by one or more processors of the ALD server 100. In accordance with the logic flow, the ALC manager 108 tracks (802) the state of each managed active load client 300 by receiving messages, periodically or responsive to polls issued by the ALC manager 108, from every active load client 300 that the ALC manager 108 manages. These messages indicate the present states of the active load clients 300. The state includes the present consumption of power for each controllable device 402-412, 420 controlled by the active load client 300 (or the total power consumption for all controllable devices 402-412, 420 controlled by the active load client 300 if individual device metering is not available) and the status of each device 402-412, 420 (e.g., either "Off" or "On"). The ALC manager 108 stores or logs (804) the power consumption and device status information in the ALD database 124 in a record corresponding to the specified active load client 300 and its associated customer and serving utility.

When the ALC manager 108 receives (806) a transaction message from the master event manager 106, the ALC manager 108 first determines (808) the type of transaction received. If the ALC manager 108 receives a "Cut" or equivalent transaction message or command from the master event manager 106, the ALC manager 108 enters (810) a "Manage" logical state. The ALC manager 108 then determines (812)

which active load clients 300 and associated devices 402-412, 420 operating on the utility specified in the "Cut" message to switch to the "Off" state. If a location (e.g., list of GPS coordinates, a GPS coordinate range, a geographic area, or a power grid reference area) is included in the "Cut" transaction message, only those active load clients 300 within the specified location are selected for switching to the "Off" state. In other words, the ALC manager 108 selects the group of active load client devices 300 to which the issue a "Turn Off" transaction message based at least partially on the geographic location of each active load client 300 as such location relates to any location identified in the received "Cut" transaction message. The ALD database 124 contains information on the present power consumption (and/or the average power consumption) for each controllable device 402-412, 420 connected to each active load client 300 in the system 10. The ALC manager 108 utilizes the stored power consumption information to determine how many, and to select which, devices 402-412, 420 to turn off to achieve the power reduction required by the "Cut" message. The ALC manager 108 then sends (814) a "Turn Off" or equivalent transaction message or command to each active load client 300, along with a list of the devices to be turned off and a "change state to off" indication for each device 402-412, 420 in the list. The ALC manager 108 then logs (816) the amount of power (either actual or average), as determined from the ALD database 124, saved for each active load client 300, along with a time stamp indicating when the power was reduced. The ALC manager 108 then schedules (818) transactions for itself to "Turn On" each turned-off device after a predetermined period of time (e.g., which may have been set from a utility specified default, set by instructions from the customer, or otherwise programmed into the ALC manager 108).

Returning back to block 808, when the ALC manager 108 receives a "Turn On" or equivalent transaction message or command from the master event manager 106 for a specified active load client 300, and the ALC manager's state is currently in a "Manage" state, the ALC manager 108 finds (820) one or more active load clients 300 that are in the "On" state and do not have any of their managed devices 402-412, 420 turned off (and are in the specified location if so required by the original "Cut" transaction message), which, when one or more of such devices 402-412, 420 are turned off, will save the same or substantially the same amount of power that is presently being saved by the specified active load clients that are in the "Off" state. Upon identifying new active load clients 300 from which to save power, the ALC manager 108 sends (822) a "Turn Off" or equivalent transaction message or command to each active load client 300 that must be turned off in order to save the same amount of power as the active load client(s) to be turned on (i.e. to have its or their managed devices 402-412, 420 turned on) or to save an otherwise acceptable amount of power (e.g., a portion of the power previously saved by the active load client(s) to be turned back on). The ALC manager 108 also sends (824) a "Turn On" or equivalent transaction message or command to each active load client 300 to be turned back on. The "Turn On" message instructs all active load clients 300 to which the message was directed to turn on any controllable devices that have been turned off, and causes the affected active load clients 300 to instruct their controllable devices 402-412, 420 to enable the flow of electric power to their associated power consuming devices (e.g., appliance, HVAC unit, and so forth). Finally, the ALC manager 108 logs (826) the time that the "Turn On" transaction message is sent in the ALD database 124.

Returning once again to block 808, when the ALC manager 108 receives an "End Event" or equivalent transaction message or command from the master event manager 106, the ALC manager 108 sends (828) a "Turn On" or equivalent transaction message or command to every active load client 300 which is currently in the "Off" state and is served by the serving utility identified in the "End Event" message or to which the "End Event" message relates. Upon determining (830) that all the appropriate active load clients 300 have transitioned to the "On" state, the ALC manager 108 sends (832) an "Event Ended" or equivalent transaction message or command to the master event manager 106.

Figure 8:
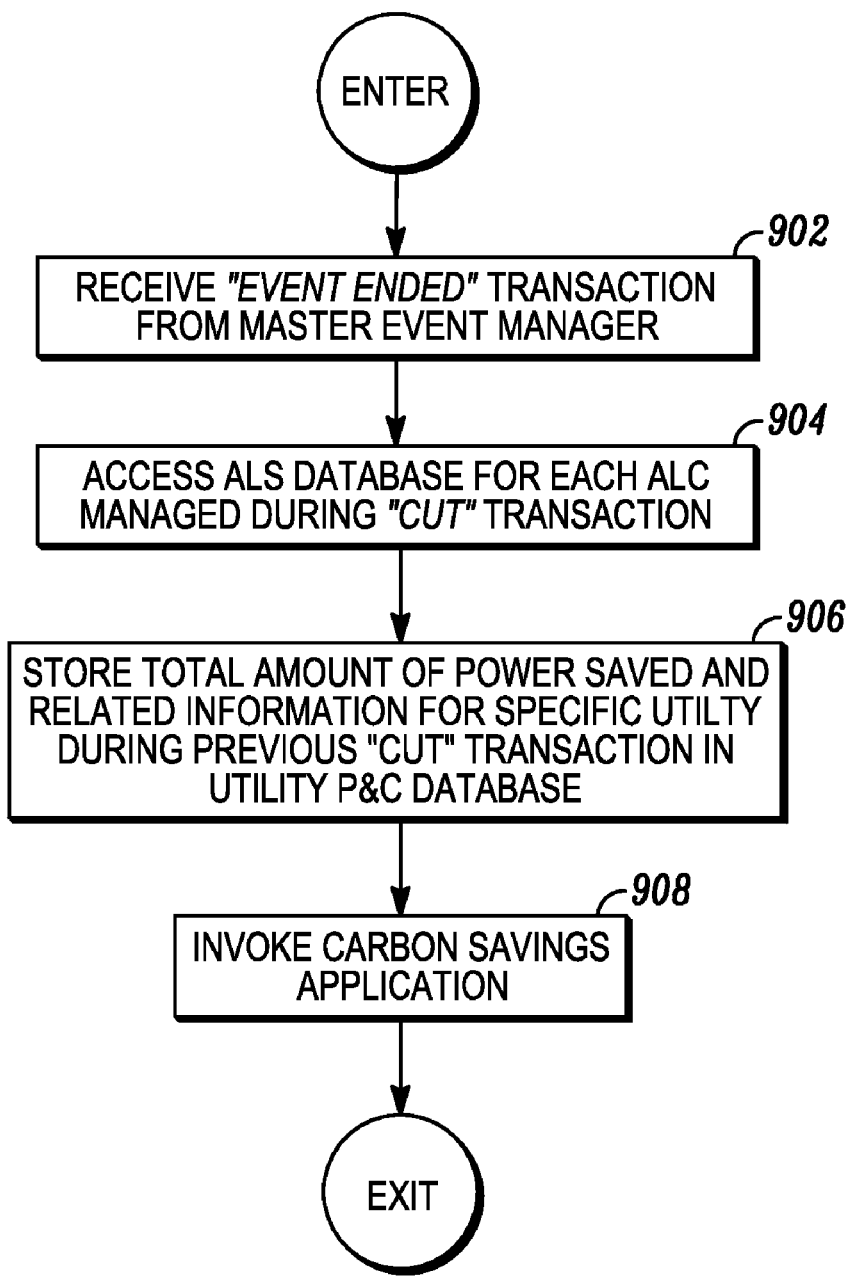
FIG. 8 is an operational flow diagram illustrating a method for tracking cumulative power savings of an electric utility in an active power load management system during a power savings event in accordance with yet another exemplary embodiment of the present invention.

Referring now to FIG. 8, exemplary operational flow diagram 900 illustrates steps executed by the ALD server 100 (e.g., through operation of the power savings application 120) to calculate and allocate power savings in the power load management system 10, in accordance with one embodiment of the present invention. The power savings application 120 calculates the total amount of power saved by each utility for each Cut event and the amount of power saved by each customer possessing an active load client 300.

According to the logic flow of FIG. 8, the power savings application 120 receives (902) an "Event Ended" or equivalent transaction message or command from the master event manager 106 each time a "Cut" or power savings event has ended. The power savings application 120 then accesses (904) the ALD database 124 for each active load client 300 involved in the "Cut" event. The database record for each active load client 300 contains the actual amount (or average amount) of power that would have been used by the active load client 300 during the last "Cut" event, along with the amount of time that each controllable device 402-412, 420 associated with the active load client 300 was turned off. The power savings application 120 uses this information to calculate the amount of power (e.g., in megawatts per hour) that was saved for each active load client 300. The total power savings for each active load client 300 is stored in its corresponding entry in the ALD database 124. A running total of power saved is kept for each "Cut" transaction. Each utility that is served by the ALD server 100 has an entry in the utility P&C database 134. The power savings application 120 stores (906) the total amount of power (e.g., in megawatts per hour) saved for the specific utility in the utility's corresponding entry in the utility P&C database 134, along with other information related to the power savings event (e.g., the time duration of the event, the number of active load clients required to reach the power savings, average length of time each device was in the off state, plus any other information that would be useful in fine tuning future events and in improving customer experience). When all active load client entries have been processed, the power savings application 120 optionally invokes (908) the carbon savings application 132 or, analogously, a sulfur dioxide savings application or a nitrogen dioxide savings application, to correlate the power savings with carbon credits, sulfur dioxide credits or nitrogen dioxide credits, respectively, based on the geographic locations of the particular serving utility and customer. Additionally, in one embodiment, the carbon savings application 132 determines carbon credits based on government approved or supplied formulas and stores the determined carbon credits on a per customer and/or per utility basis.

As described above, the present invention encompasses a method for managing and distributing power within a power management system based on real-time feedback from addressable and remotely controllable devices including the actual amount of power currently being individually or collectively consumed by the addressable devices. With this invention, a power management system may pinpoint specific areas of high power usage and more accurately distribute power loads to utilities in need. Additionally, the present invention provides optional participation incentives for customers based on the amount of their actual participation in the power management system.

In the foregoing specification, the present invention has been described with reference to specific embodiments. However, one of ordinary skill in the art will appreciate that various modifications and changes may be made without departing from the spirit and scope of the present invention as set forth in the appended claims. For example, the present invention is applicable for managing the distribution of power from utility companies to subscribing customers using any number of IP-based or other communication methods. Additionally, the functions of specific modules within the ALD server 100 and/or active load client 300 may be performed by one or more equivalent means. Accordingly, the specification and drawings are to be regarded in an illustrative rather than a restrictive sense, and all such modifications are intended to be included within the scope of the present invention.

Benefits, other advantages, and solutions to problems have been described above with regard to specific embodiments of the present invention. However, the benefits, advantages, solutions to problems, and any element(s) that may cause or result in such benefits, advantages, or solutions to become more pronounced are not to be construed as a critical, required, or essential feature or element of any or all the claims. The invention is defined solely by the appended claims including any amendments made during the pendency of this application and all equivalents of those claims as issued.

What is claimed is:

1. A method for managing a flow of power supplied by an electric utility, the method comprising:
   receiving a power control message indicating at least one of an amount of electric power to be reduced and an identification of at least one controllable device to be instructed to disable a flow of electric power to at least one associated power consuming device, the power control message being responsive to a power reduction request issued by the electric utility; and
   responsive to the power control message, disabling a flow of electric power to at least one power consuming device.

2. The method of claim 1, wherein disabling a flow of electric power to at least one power consuming device comprises:
   issuing a power management command to disable a flow of electric power to the at least one power consuming device.

3. The method of claim 2, wherein the power management command is communicated to a controllable device and causes the controllable device to disable a flow of electric power to the at least one power consuming device.

4. The method of claim 1, wherein the power control message is received from a system controller managing a flow of electric power supplied by at least the electric utility.

5. The method of claim 1, wherein the power control message is associated with a power reduction event, the method further comprising:
   subsequent to disabling a flow of electric power to the at least one power consuming device, receiving a second power control message indicating an end of the power reduction event; and
   responsive to the second power control message, enabling a flow of electric power to the at least one power consuming device.

6. A method for a client device to manage a flow of power supplied by an electric utility, the client device controlling one or more controllable devices that control a flow of electric power to at least one power consuming device, the method comprising:
   receiving a power control message from a system controller, the power control message being responsive to a power reduction request issued by the electric utility and indicating at least one of an amount of electric power to be reduced and an identification of at least one controllable device to be instructed to disable a flow of electric power to at least one associated power consuming device; and
   disabling a flow of electric power to the at least one power consuming device based on the power control message.

7. The method of claim 6, wherein the power control message includes an identification of at least one controllable device to be instructed to disable a flow of electric power to at least one associated power consuming device and wherein disabling a flow of electric power to the at least one power consuming device comprises:
   issuing a power management command to the at least one controllable device, the power management command causing the at least one controllable device to disable a flow of electric power to at least one associated power consuming device.

8. The method of claim 6, wherein the power control message includes an amount of electric power to be reduced and wherein disabling a flow of electric power to at least one power consuming device comprises:
   disabling a flow of electric power to the at least one power consuming device so as to reduce electric power consumption by the amount included in the power control message.

9. The method of claim 6, wherein the power control message is associated with a power reduction event, the method further comprising:
   subsequent to disabling a flow of electric power to the at least one power consuming device, receiving a second power control message from the system controller indicating an end of the power reduction event; and
   responsive to the second power control message, enabling a flow of electric power to the at least one power consuming device.

10. The method of claim 6, further comprising:
    communicating a report message to the system controller, the report message including an indication of an amount of power consumed by the at least one power consuming device.

11. A method for a client device to manage a flow of power supplied by an electric utility to a plurality of power consuming devices, the client device being responsive to power control messages issued by a system controller and controlling one or more controllable devices that control a flow of electric power to at least some of the plurality of power consuming devices, the method comprising: receiving a power control message from the system controller, the power control message being responsive to a power reduction request issued by the electric utility and indicating at least one of an amount of electric power to be reduced and an identification of at least one controllable device to be instructed to disable a flow of electric power to one or more associated power consuming devices; and
    responsive to the power control message, communicating a power management command to a controllable device, the power management command causing the controllable device to disable a flow of electric power to at least one associated power consuming device.

12. The method of claim 11, wherein the power control message is encrypted, the method further comprising:
decrypting the power control message responsive to receiving the power control message.

13. The method of claim 11, further comprising:
communicating a report message to the system controller, the report message including an indication of an amount of power consumed by at least one power consuming device.

14. The method of claim 11, further comprising:
communicating a status message to the system controller, the status message indicating statuses of the one or more controllable devices.

15. The method of claim 11, further comprising:
communicating a status message to the system controller, the status message indicating a total amount of power consumed by power consuming devices under control of the one or more controllable devices.

16. The method of claim 11, further comprising:
subsequent to communicating the power management command, receiving a second power control message from the system controller, the second power control message instructing the client device to enable a flow of electric power to power consuming devices that had a flow of electric power previously disabled.

17. The method of claim 11, wherein at least one smart meter is coupled to the client device, the method further comprising:
receiving a control message from the system controller instructing the client device to read the at least one smart meter;
responsive to receipt of the control message, communicating a command to the at least one smart meter requesting a power reading; and
responsive to receipt of the power reading, communicating the power reading to the system controller.

18. The method of claim 11, further comprising:
receiving a status message from the system controller, the status message requesting status information for the one or more controllable devices;
polling the one or more controllable devices responsive to the status message;
receiving a status response message from each of the one or more controllable devices responsive to the polling, each status response message including operational information for a particular controllable device; and
storing each status response message in a memory for reference in connection with power reduction events, wherein the power control message is associated with a power reduction event.

19. The method of claim 11, wherein the client device includes a Layer-3 router and wherein at least one Internet-accessible device is coupled to the client device, the method further comprising:
receiving, by the Layer-3 router, an Internet Protocol (IP) message that includes an IP address;
determining, by the Layer-3 router, whether the IP message is directed to an Internet-accessible device coupled to the client device; and
communicating the IP message to the Internet-accessible device responsive to a determination that the IP message is directed to the Internet-accessible device.

20. The method of claim 19, wherein the IP message is encrypted, the method further comprising:
determining, by the Layer-3 router, whether the IP message is directed to the client device instead of the Internet-accessible device; and
decrypting the IP message responsive to a determination that the IP message is directed to the client device instead of the Internet-accessible device.

21. The method of claim 11, wherein the client device is coupled to a host Internet Protocol (IP) network, the method further comprising:
dynamically requesting IP addresses for at least one of the client device and the one or more controllable devices from a dynamic host configuration protocol server on the host IP network.

22. The method of claim 11, wherein the power management command at least partially achieves a reduction in consumed power as requested by a control center of the electric utility.

23. The method of claim 11, wherein the power control message includes a list of controllable devices to be instructed to disable a flow of electric power to associated power consuming devices and wherein the power management command causes controllable devices identified in the list to disable a flow of electric power to associated power consuming devices.

24. The method of claim 23, wherein the power control message includes Internet Protocol addresses of the controllable devices in the list.

25. A client device for use in a system that manages consumption of power supplied by an electric utility to a plurality of power consuming devices, wherein power flow to at least some of the plurality of power consuming devices is controlled by a plurality of controllable devices, wherein at least one controllable device operates under the control of the client device, and wherein the client device receives power control messages from a system controller, the client device comprising:
at least one controllable device interface facilitating communication of power control instructions to the at least one controllable device, the power control instructions causing the at least one controllable device to selectively enable and disable a flow of electric power to at least one power consuming device of the plurality of power consuming devices; and
a device control manager operable to communicate a power control instruction to the at least one controllable device through the at least one controllable device interface responsive to a received power control message, the received power control message being responsive to a power reduction request issued by the electric utility, the power control instruction causing the at least one controllable device to disable a flow of electric power to at least one associated power consuming device.

26. The client device of claim 25, wherein the received power control message indicates at least one of an amount of electric power to be reduced and an identification of a controllable device to be instructed to disable a flow of electric power to one or more associated power consuming devices.

27. The client device of claim 25, further comprising:
a communications interface facilitating communications between the system controller and the client device,
wherein the device control manager communicates at least one power consumption indicator and at least one power management status to the system controller via the communications interface.

28. The client device of claim 27, wherein the at least one power consumption indicator includes a power consumption indicator associated with each controllable device and wherein the at least one power management status includes a power management status associated with each controllable device.

29. The client device of claim 25, wherein the received power control message includes Internet Protocol addresses of one or more controllable devices to be instructed to disable a flow of electric power to one or more associated power consuming devices.

30. The client device of claim 25, further comprising:
a Layer-3 router operable to receive an Internet Protocol (IP) message that includes an IP address and determine whether the IP message is directed to the client device or an Internet-accessible device coupled to the client device; and
an IP device interface operable to receive the IP message from the Layer-3 router and communicate the IP message to the Internet-accessible device when the IP message is directed to the Internet-accessible device.

31. A client device for use in a system that manages consumption of power supplied by an electric utility to a plurality of power consuming devices, wherein power flow to at least some of the plurality of power consuming devices is controlled by a plurality of controllable devices, wherein at least one controllable device operates under the control of the client device, and wherein the client device receives a plurality of power control messages from a system controller, the client device comprising:
a communications interface operable to receive the plurality of power control messages from the system controller, a power control message of the plurality of power control messages being responsive to a power reduction request issued by a control center of the electric utility and indicating at least one of an amount of electric power to be reduced and an identification of at least one controllable device to be instructed to disable a flow of electric power to one or more associated power consuming devices;
at least one controllable device interface facilitating communication of power control instructions to the at least one controllable device, the power control instructions causing the at least one controllable device to selectively enable and disable a flow of electric power to at least one power consuming device of the plurality of power consuming devices; and
a device control manager operable to communicate a power control instruction to the at least one controllable device through the at least one controllable device interface responsive to the power control message, the power control instruction causing the at least one controllable device to disable a flow of electric power to at least one associated power consuming device so as to assist in achieving a reduction in consumed power as requested by the control center of the electric utility.

32. The client device of claim 31, wherein the power control message includes a list of controllable devices to be instructed to disable a flow of electric power to associated power consuming devices.

33. The client device of claim 32, wherein the power control message includes Internet Protocol addresses of the controllable devices in the list.

34. The client device of claim 31, further comprising:
a Layer-3 router operable to receive an Internet Protocol (IP) message that includes an IP address and determine whether the IP message is directed to the client device or an Internet-accessible device coupled to the client device; and
an IP device interface operable to receive the IP message from the Layer-3 router and communicate the IP message to the Internet-accessible device when the IP message is directed to the Internet-accessible device.

35. A client device for use in a system that manages consumption of power supplied by an electric utility to a plurality of power consuming devices, wherein power flow to at least some of the plurality of power consuming devices is controlled by a plurality of controllable devices, wherein at least one controllable device operates under the control of the client device, and wherein the client device receives power control messages from a system controller, the client device comprising:
at least one controllable device interface facilitating communication of power control instructions to the at least one controllable device, the power control instructions causing the at least one controllable device to selectively enable and disable a flow of electric power to at least one power consuming device of the plurality of power consuming devices;
a device control manager operable to generate the power control instructions responsive to the received power control messages;
a Layer-3 router operable to receive an Internet Protocol (IP) message that includes an IP address and determine whether the IP message is directed to the client device or an Internet-accessible device coupled to the client device, wherein the Internet-accessible device is a device other than the at least one controllable device; and
an IP device interface operable to receive the IP message from the Layer-3 router and communicate the IP message to the Internet-accessible device when the IP message is directed to the Internet-accessible device.

36. The client device of claim 35, wherein a received power control message is responsive to a power reduction request issued by a control center of the electric utility and indicates at least one of an amount of electric power to be reduced and an identification of at least one controllable device to be instructed to disable a flow of electric power to one or more associated power consuming devices.

37. The client device of claim 36, wherein the received power control message includes a list of controllable devices to be instructed to disable a flow of electric power to associated power consuming devices.

38. The client device of claim 37, wherein the received power control message includes Internet Protocol addresses of the controllable devices in the list.

39. A client device for use in a system that manages consumption of power supplied by an electric utility to a plurality of power consuming devices, wherein power flow to at least some of the plurality of power consuming devices is controlled by a plurality of controllable devices, wherein one or more of the plurality of controllable devices operates under the control of the client device, and wherein the client device receives a plurality of power control messages from a system controller, the client device comprising:
a communications interface operable to receive the plurality of power control messages from the system controller, a power control message of the plurality of power control messages indicating at least one of an amount of electric power to be reduced and an identification of at least one controllable device to be instructed to disable a flow of electric power to one or more associated power consuming devices;
at least one controllable device interface facilitating communication of a power control instruction to at least a first controllable device, the power control instruction causing the first controllable device to disable a flow of electric power to at least one power consuming device of the plurality of power consuming devices;

a device control manager operable to generate the power control instruction responsive to the power control message;

a Layer-3 router operable to receive an Internet Protocol (IP) message that includes an IP address and determine whether the IP message is directed to the client device or an Internet-accessible device coupled to the client device, wherein the Internet-accessible device is a device other than the at least one controllable device; and an IP device interface operable to receive the IP message from the Layer-3 router and communicate the IP message to the Internet-accessible device when the IP message is directed to the Internet-accessible device.

40. The client device of claim 39, wherein the power control message is responsive to a power reduction request issued by a control center of the electric utility.

41. The client device of claim 39, wherein the Layer-3 router is further operable to determine that the power control message is an IP message directed to the client device.

42. A method for managing a flow of electric power supplied by an electric utility to a residence or a business, the method comprising:

determining an amount of electric power consumed by at least one power consuming device;

reporting the amount of consumed electric power to a system controller via a network;

some time after reporting the amount of consumed electric power, receiving a power control message from the system controller, the power control message being responsive to a power reduction request issued by the electric utility and requiring a reduction in power consumed by the at least one power consuming device; and responsive to the power control message, reducing a flow of electric power to the at least one power consuming device.

43. The method of claim 42, wherein the power control message indicates at least one of an amount of electric power to be reduced and an identification of at least one controllable device to be instructed to disable a flow of electric power to the at least one power consuming device.

44. The method of claim 42, wherein reducing a flow of electric power to the at least one power consuming device comprises:

disabling a flow of electric power to the at least one power consuming device.

45. The method of claim 44, wherein disabling a flow of electric power to the at least one power consuming device comprises:

issuing a power management command to disable a flow of electric power to the at least one power consuming device.

46. The method of claim 45, wherein the power management command is communicated to a controllable device and causes the controllable device to disable a flow of electric power to the at least one power consuming device.

47. The method of claim 44, wherein the power control message is associated with a power reduction event, the method further comprising:

subsequent to disabling a flow of electric power to the at least one power consuming device, receiving a second power control message indicating an end of the power reduction event; and responsive to the second power control message, enabling a flow of electric power to the at least one power consuming device.

48. The method of claim 42, wherein the power control message is associated with a power reduction event, the method further comprising:

subsequent to reducing a flow of electric power to the at least one power consuming device, receiving a second power control message indicating an end of the power reduction event; and responsive to the second power control message, increasing a flow of electric power to the at least one power consuming device.

49. The method of claim 42, wherein reporting the amount of consumed electric power comprises:

periodically reporting the amount of consumed electric power to the system controller.

50. The method of claim 42, wherein reporting the amount of consumed electric power comprises:

receiving a polling message from the system controller; and reporting the amount of consumed electric power responsive to the polling message.

51. The method of claim 42, wherein the power control message requires that electric power be disabled to the at least one power consuming device.

* * * * *